US010822443B2

(12) United States Patent
Fuchs et al.

(10) Patent No.: US 10,822,443 B2
(45) Date of Patent: Nov. 3, 2020

(54) WASHING- AND CLEANING-ACTIVE POLYMER FILMS, PROCESS FOR THE PRODUCTION THEREOF AND USE THEREOF

(71) Applicant: BASF SE, Ludwigshafen am Rhein (DE)

(72) Inventors: Yannick Fuchs, Ludwigshafen (DE); Juergen Detering, Ludwigshafen (DE); Markus Meise, Ludwigshafen (DE); Benjamin Schmidt-Hansberg, Ludwigshafen (DE); Claudia Esper, Ludwigshafen (DE)

(73) Assignee: BASF SE, Lugwigshafen (DE)

( * ) Notice: Subject to any disclaimer, the term of this patent is extended or adjusted under 35 U.S.C. 154(b) by 0 days.

(21) Appl. No.: 16/084,712

(22) PCT Filed: Mar. 15, 2017

(86) PCT No.: PCT/EP2017/056089
§ 371 (c)(1),
(2) Date: Sep. 13, 2018

(87) PCT Pub. No.: WO2017/158002
PCT Pub. Date: Sep. 21, 2017

(65) Prior Publication Data
US 2019/0077895 A1   Mar. 14, 2019

(30) Foreign Application Priority Data

Mar. 16, 2016  (EP) .................................... 16160745

(51) Int. Cl.
| | | |
|---|---|---|
| *C11D 3/37* | (2006.01) | |
| *C08F 220/06* | (2006.01) | |
| *C08F 222/02* | (2006.01) | |
| *C08J 5/18* | (2006.01) | |
| *C08F 20/06* | (2006.01) | |
| *C08F 2/30* | (2006.01) | |
| *C08F 2/06* | (2006.01) | |
| *C08F 2/10* | (2006.01) | |
| *C08L 71/02* | (2006.01) | |
| *C11D 17/00* | (2006.01) | |
| *C08F 120/06* | (2006.01) | |

(52) U.S. Cl.
CPC .............. *C08F 220/06* (2013.01); *C08F 2/06* (2013.01); *C08F 2/10* (2013.01); *C08F 2/30* (2013.01); *C08F 20/06* (2013.01); *C08F 222/02* (2013.01); *C08J 5/18* (2013.01); *C08L 71/02* (2013.01); *C11D 3/3707* (2013.01); *C11D 17/0039* (2013.01); *C08F 120/06* (2013.01); *C08J 2333/02* (2013.01); *C08J 2471/02* (2013.01)

(58) Field of Classification Search
CPC ....... C11D 3/37; C11D 3/3707; C11D 3/3757; C08F 220/06; C08F 222/02
See application file for complete search history.

(56) References Cited

U.S. PATENT DOCUMENTS

| | | |
|---|---|---|
| 3,234,258 A | 2/1966 | Morris |
| 3,887,806 A | 6/1975 | Rodak |
| 4,604,224 A | 8/1986 | Cheng |
| 5,075,041 A | 12/1991 | Lutz |
| 5,227,446 A | 7/1993 | Denzinger et al. |
| 5,360,569 A | 11/1994 | Madison |
| 5,399,286 A | 3/1995 | Funhoff et al. |
| 5,756,456 A | 5/1998 | Ho |
| 10,323,215 B2 * | 6/2019 | Fuchs .................. A61K 47/32 |
| 10,344,249 B2 * | 7/2019 | Fuchs .................. C08F 120/06 |
| 2016/0369209 A1 * | 12/2016 | Fuchs .................. A61K 8/8152 |
| 2017/0114154 A1 | 4/2017 | Shabelina et al. |
| 2017/0275567 A1 | 9/2017 | Caires et al. |
| 2017/0321008 A1 | 11/2017 | Teurkoglu et al. |

FOREIGN PATENT DOCUMENTS

| | | |
|---|---|---|
| CN | 102015993 A | 4/2011 |
| DE | 4106355 A1 | 9/1992 |
| DE | 4313909 A1 | 11/1994 |
| DE | 4415623 A1 | 11/1995 |
| EP | 0001004 B1 | 2/1982 |
| EP | 0396303 A2 | 7/1990 |
| EP | 0451508 A1 | 10/1991 |
| EP | 0453003 A2 | 10/1991 |

(Continued)

OTHER PUBLICATIONS

Lev Bromberg, Journal of Physical Chemistry, 1998, 102(11), 1956-1963.
Lev Bromberg, Ind. Eng. Chem. Res. 1998, 37, 4267-4274.
International Search Report for International Application No. PCT/EP2017/056089, dated Apr. 10, 2017, 3 pages.

* cited by examiner

*Primary Examiner* — Brian P Mruk
(74) *Attorney, Agent, or Firm* — Armstrong Teasdale LLP

(57) ABSTRACT

A washing- and cleaning-active polymer film is disclosed. The washing- and cleaning-active polymer film includes a polymer composition obtainable by a free-radical polymerization of a monomer composition. The monomer composition includes at least one $\alpha,\beta$-ethylenically unsaturated carboxylic acid or acid salt. The monomer composition is subjected to a free-radical polymerization in the presence of at least one polyether component. A process for producing the washing- and cleaning-active polymer film is further disclosed. A use of the polymer film and a covering or coating for a detergent or cleaner portion including the polymer film is disclosed.

16 Claims, No Drawings

(56) References Cited

FOREIGN PATENT DOCUMENTS

| | | |
|---|---|---|
| EP | 0454126 A1 | 10/1991 |
| EP | 0581452 A1 | 2/1994 |
| EP | 0511037 B1 | 9/1994 |
| EP | 0656914 A1 | 6/1995 |
| EP | 0877002 A2 | 11/1998 |
| JP | S58217598 A | 12/1983 |
| WO | 1990013533 A1 | 11/1990 |
| WO | 1994001486 A1 | 1/1994 |
| WO | 1994021777 A1 | 9/1994 |
| WO | 1995007331 A1 | 3/1995 |
| WO | 2000055044 A1 | 9/2000 |
| WO | 2001000781 A1 | 1/2001 |
| WO | 2005012378 A1 | 2/2005 |
| WO | 2015000969 A2 | 1/2015 |
| WO | 2015000970 A1 | 1/2015 |
| WO | 2015000971 A1 | 1/2015 |
| WO | WO 2015/000970 * 1/2015 | ............ C08F 220/06 |
| WO | 2017037210 A1 | 3/2017 |
| WO | 2017042112 A1 | 3/2017 |
| WO | 2017068024 A1 | 4/2017 |
| WO | 2017089115 A1 | 6/2017 |
| WO | 2017089116 A1 | 6/2017 | ial. Example 4 (page 19, lines# WASHING- AND CLEANING-ACTIVE POLYMER FILMS, PROCESS FOR THE PRODUCTION THEREOF AND USE THEREOF

CROSS-REFERENCE TO RELATED APPLICATIONS

This application is a U.S. National Phase Application of PCT/EP2017/056089, filed Mar. 15, 2017, which claims the benefit of priority to EP Application No. 16160745.2, filed Mar. 16, 2016, the contents of which are hereby expressly incorporated by reference in their entirety.

BACKGROUND OF THE INVENTION

The present invention relates to a washing- and cleaning-active polymer film which comprises a polymer composition P) or consists of a polymer composition P) which is obtainable by free-radical polymerization of a monomer composition M), where the monomer composition M) comprises at least one $\alpha,\beta$-ethylenically unsaturated carboxylic acid or a salt thereof and is subjected to a free-radical polymerization in the presence of at least one polyether component. The invention furthermore relates to a process for producing such a washing- and cleaning-active polymer film, to the use of such a polymer film and to a covering or coating for a detergent or cleaner portion which comprises such a polymer film or consists thereof.

PRIOR ART

It is known to use water-soluble films of polyvinyl alcohol for the portionwise packaging of liquid, gel-like and solid detergents and cleaners. The polyvinyl alcohol film dissolves at the start of the washing and cleaning process and releases the detergents and cleaners so that these can develop their effect. The advantages of the portionwise packaged detergents and cleaners (so-called single dose units or mono dose units) for the consumer are manifold. These include the avoidance of incorrect dosages, ease of handling, and the fact that the consumer does not come into physical contact with the ingredients of the detergents and cleaners. These also furthermore include esthetic aspects which lead to a preference for the portionwise packaged detergents and cleaners. Current dosage forms can comprise a large number of separately formulated active ingredients and auxiliaries which are released individually in the cleaning process. Such multichamber systems permit, for example, the separation of incompatible ingredients and thus the creation of new formulation concepts. The fraction of polyvinyl alcohol film in the total weight of the detergent or cleaner portion (single dose unit) is between 2 and 20% by weight, according to application.

The biggest disadvantage of the polyvinyl alcohol films is that they only serve as packaging material and make no contribution at all to the washing and cleaning performance. There is therefore a need for washing- and cleaning-active polymer films.

Lev Bromberg describes in the Journal of Physical Chemistry B (1998), 102, 11, 1956-1963, a material with thermoreversible gel formation, the production of which involves polymerizing acrylic acid in the presence of a PEO-PPO-PEO block copolymer. The reaction takes place in the absence of external solvents in order to achieve a high fraction of branching and crosslinking in the resulting products. These are neither water-soluble nor transparent. Possible fields of use for these polymers that are specified are only very generally pharmacy and food supplementation (p. 1956, left-hand column, "Introduction").

Lev Bromberg describes in Ind. Eng. Chem. Res. 1998, 37, 4267-4274, polyether-modified polyacrylic acids, where specifically partially neutralized acrylic acid is polymerized in the presence of a PEO-PPO-PEO block copolymer.

WO 2005/012378 describes aqueous dispersions of water-soluble polymers of anionic monomers and their use as thickeners for aqueous systems. To produce them, anionic monomers are polymerized in the presence of two water-soluble polymers from different classes, which may, inter alia, also be polyalkylene glycols. Example 4 (page 19, lines 14-27) relates to the polymerization of acrylic acid in the presence of two different polypropylene glycols and of maltodextrin. The dispersions are used inter alia in personal care products, and in detergents and cleaners. A use in the form of films is not described.

WO 2015/000969 describes the use of a gel-like polymer composition obtainable by a process in which a) a monomer composition M) is provided which consists of
 A) at least one $\alpha,\beta$-ethylenically unsaturated acid and
 B) 0 to 0.1% by weight, based on the total weight of the monomer composition M), of crosslinking monomers which have two or more than two polymerizable $\alpha,\beta$-ethylenically unsaturated double bonds per molecule,
b) the monomer composition M) provided in step a) is subjected to a free-radical polymerization in the presence of at least one polyether component PE) which is selected from polyetherols with a number-average molecular weight of at least 200 g/mol and their mono- and di($C_1$-$C_6$-alkyl ethers), surfactants containing polyether groups, and mixtures thereof, in formulations for machine dishwashing. A use in the form of films is again not described.

WO 2015/000971 describes the use of a gel-like polymer composition as described in WO 2015/000969 for further uses, but not in the form of films.

WO 2015/000971 describes a process for producing a solid polymer composition, in particular in the form of a film or in the form of a solid coating on a substrate or in particle form, in which a) a monomer composition M) is provided which comprises
 A) at least one $\alpha,\beta$-ethylenically unsaturated carboxylic acid, and
 B) less than 0.1% by weight, based on the total weight of the monomer composition M), of crosslinking monomers which have two or more than two polymerizable $\alpha,\beta$-ethylenically unsaturated double bonds per molecule,
 and
b) the monomer composition M) provided in step a) is subjected to a free-radical polymerization in the presence of at least one polyether component PE) which is selected from polyetherols with a number-average molecular weight of at least 200 g/mol and their mono- and di($C_1$-$C_6$-alkyl ethers), surfactants containing polyether groups, and mixtures thereof.

WO 01/00781 describes an active ingredient portion pack comprising at least one washing-, cleaning- or dishwashing-active preparation and an envelopment completely or partially surrounding the washing-, cleaning- or dishwashing-active preparation, in which the envelopment is soluble under washing, cleaning or dishwashing conditions and comprises at least one individual component of the washing-, cleaning- or dishwashing-active preparation in bonded form. It is not described that the material of the envelopment itself actively participates in the washing or cleaning operation.

Surprisingly, it has now been found that it is possible to provide polymer films which are advantageously suitable as covering or coating for producing detergent or cleaner portions and where the polymer itself actively participates in the washing and cleaning process.

SUMMARY OF THE INVENTION

A first subject matter of the invention is a washing- and cleaning-active polymer film, comprising or consisting of a polymer composition P) obtainable by free-radical polymerization of a monomer composition M) which comprises at least one monomer A) selected from α,β-ethylenically unsaturated carboxylic acids, salts of α,β-ethylenically unsaturated carboxylic acids and mixtures thereof, in the presence of at least one ($C_8$-$C_{18}$-alkyl)polyoxyalkylene ether having on average 3 to 12 alkylene oxide units per molecule.

The invention further provides a process for producing a polymer film as defined above and below, in which
a) a monomer composition M) is provided which comprises at least one monomer selected from α,β-ethylenically unsaturated carboxylic acids, salts of α,β-ethylenically unsaturated carboxylic acids and mixtures thereof,
b) the monomer composition M) provided in step a) is subjected to a free-radical polymerization in the presence of at least one ($C_8$-$C_{18}$-alkyl)polyoxyalkylene ether having 3 to 12 alkylene oxide units per molecule and optionally in the presence of at least one additive,
c) the polymer composition obtained in step b) is converted to a polymer film.

The invention further provides the use of a polymer film as defined above and below for the at least partial covering of a liquid or solid detergent and cleaner.

The invention further provides a covering or coating for a detergent or cleaner portion, comprising or consisting of a polymer film, as defined above and below.

The invention further provides a detergent or cleaner, comprising:
A) at least covering and/or coating, comprising or consisting of a polymer film as defined above and below,
B) at least one surfactant,
C) optionally at least one builder,
D) optionally at least one bleach system,
E) optionally at least one further additive, which is preferably selected from enzymes, bases, corrosion inhibitors, antifoams, dyes, fragrances, fillers, tableting auxiliaries, disintegrants, thickeners, solubility promoters, organic solvents, electrolytes, pH adjusting agents, perfume carriers, fluorescent agents, hydrotropes, antiredeposition agents, optical brighteners, graying inhibitors, shrink preventers, anticrease agents, color transfer inhibitors, antimicrobial active ingredients, antioxidants, corrosion inhibitors, antistats, ironing aids, phobicization and impregnation agents, swelling and slip-resist agents and UV absorbers, and
F) optionally water.

DESCRIPTION OF THE INVENTION

The polymer films according to the invention or produced by the process according to the invention are suitable for the portionwise packaging of liquid, gel-like and solid detergents and cleaners. They dissolve at the start of the particular application (e.g. in the washing or dishwashing water), thus release the ingredients of the detergents and cleaners and contribute in dissolved form on account of their dispersing, film-inhibiting, emulsifying and surface-active properties to the washing and cleaning performance to a considerable extent.

In the context of the present invention, the terms "detergent portion" and "cleaner portion" are understood as meaning an amount of a detergent or of a cleaner that suffices for a washing or cleaning operation taking place in an aqueous phase. This may for example be a machine washing operation, as is carried out using standard commercial washing machines. According to the invention, this term is also understood as meaning an active ingredient portion for a hand wash operation or a cleaning operation carried out by hand (as is carried out, e.g., in a hand washing basin or in a bowl). The washing- and cleaning-active polymer films according to the invention are preferably used for producing active ingredient portions for machine washing or cleaning operations.

In the context of this application, compounds which can be derived from acrylic acid and methacrylic acid are sometimes referred to by adding the syllable "(meth)" to the compound derived from acrylic acid.

Suitable $C_1$-$C_4$-alkyl groups, $C_1$-$C_7$-alkyl groups, $C_8$-$C_{18}$-alkyl groups and $C_{12}$-$C_{18}$-alkyl groups are in each case linear and (above 3 carbon atoms) branched alkyl groups.

In the context of the present invention, $C_1$-$C_4$-alkyl is a linear or branched alkyl radical having 1 to 4 carbon atoms. Suitable $C_1$-$C_4$-alkyls are methyl, ethyl, n-propyl, isopropyl, n-butyl, sec-butyl, isobutyl and tert-butyl.

In the context of the present invention, $C_1$-$C_7$-alkyl is a linear or branched alkyl radical having 1 to 7 carbon atoms. Suitable $C_1$-$C_7$-alkyls are methyl, ethyl, propyl, isopropyl, n-butyl, sec-butyl, isobutyl, tert-butyl, n-pentyl, n-hexyl, n-heptyl and constitutional isomers thereof.

$C_{12}$-$C_{18}$-alkyl is a linear or branched alkyl radical having 12 to 18 carbon atoms. Suitable $C_{12}$-$C_{18}$-alkyls are dodecyl, tridecyl, tetradecyl, pentadecyl, hexadecyl, heptadecyl, octadecyl, nonadecyl, eicosyl, henicosyl, docosyl, tricosyl, tetracosyl and constitutional isomers thereof. In a preferred embodiment, they are predominantly linear $C_{12}$-$C_{18}$-alkyl radicals, as also occur in natural or synthetic fatty alcohols, and oxo alcohols.

$C_8$-$C_{18}$-alkyl is a linear or branched alkyl radical having 8 to 18 carbon atoms. Suitable $C_8$-$C_{18}$-alkyls are octyl, 2-ethylhexyl, nonyl, decyl, 2-propylheptyl, undecyl, dodecyl, tridecyl, tetradecyl, pentadecyl, hexadecyl, heptadecyl, octadecyl, nonadecyl, eicosyl, henicosyl, docosyl, tricosyl, tetracosyl and constitutional isomers thereof. In a preferred embodiment, they are predominantly linear $C_8$-$C_{18}$-alkyl radicals, as also occur in natural or synthetic fatty alcohols, and oxo alcohols.

In the context of the present application, the expression $C_9C_{11}$-alcohols is a mixture which comprises alcohols having 9 carbon atoms and alcohols having 11 carbon atoms. $C_{12}C_{14}$-alcohols are a mixture which comprises alcohols having 12 carbon atoms and alcohols having 14 carbon atoms. $C_{13}C_{15}$-alcohols are a mixture which comprises alcohols having 13 carbon atoms and alcohols having 15 carbon atoms. $C_{12}C_{18}$-alcohols are a mixture which comprises alcohols having 12 carbon atoms, alcohols having 14 carbon atoms, alcohols having 16 carbon atoms and alcohols having 18 carbon atoms.

The preparation of polymer composition P) takes place by free-radical polymerization of the monomer composition M) in the presence of at least one ($C_8$-$C_{18}$-alkyl)polyoxyalkylene ether having on average 3 to 12 alkylene oxide units per molecule. Here, specific polymer compositions P) with advantageous properties are obtained. Without being bound to one theory, hydrogen bridges are able to form between the growing polymer and the alkylene oxide units and these influence the properties of the resulting polymer composition. Thus, polymer compositions P) with a high content of the ($C_8$-$C_{18}$-alkyl)polyoxyalkylene ether can be attained, as cannot be produced by mixing the separately prepared polymer with the ($C_8$-$C_{18}$-alkyl)polyoxyalkylene ether. A free-radical surfactant degradation advantageously does not take place here.

In the context of the present invention, the term "polymer film" refers to a flat structure which has an essentially two-dimensional extension. The thickness of the films according to the invention is preferably 0.5 µm to 10 mm, particularly preferably 1 µm to 5 mm. The length and/or width of the film is generally at least 5 mm and preferably at least 10 mm. The maximum length and/or width of the film is generally unimportant and can be in the millimeter, centimeter or meter range depending on the area of application.

To produce the washing- and cleaning-active polymer films according to the invention, preference is given to using polymer compositions P) with a low glass transition temperature $T_G$. Preferably, the polymer compositions P) used for producing the washing- and cleaning-active polymer films according to the invention have a glass transition temperature $T_G$ in the range from 0 to 80° C., particularly preferably from 0 to 60° C., in particular from 0 to 30° C.

The glass transition temperatures (Tg) described in the course of this application can be determined by means of differential scanning calorimetry (DSC).

In a preferred embodiment, the polymer compositions P) used for producing the washing- and cleaning-active polymer films according to the invention are present in the form of a transparent film.

Monomer Composition M)
Monomer A)

The monomer composition M) used for producing the polymer composition P) comprises at least one monomer A) which is selected from α,β-ethylenically unsaturated carboxylic acids, salts of α,β-ethylenically unsaturated carboxylic acids and mixtures thereof.

In a specific embodiment, the monomer composition M) consists only of α,β-ethylenically unsaturated carboxylic acids, salts of α,β-ethylenically unsaturated carboxylic acids and mixtures thereof.

The α,β-ethylenically unsaturated carboxylic acid is preferably selected from acrylic acid, methacrylic acid, ethacrylic acid, maleic acid, fumaric acid, itaconic acid, α-chloro-acrylic acid, crotonic acid, citraconic acid, mesaconic acid, glutaconic acid and aconitic acid. Suitable salts of the aforementioned acids are, in particular, the sodium, potassium and ammonium salts, and the salts with amines. The monomers A) can be used as such or as mixtures with one another. The stated weight fractions all refer to the acid form.

Preferably, the at least one α,β-ethylenically unsaturated carboxylic acid is used for the polymerization in non-neutralized form. If the α,β-ethylenically unsaturated carboxylic acids are used for the polymerization in partially neutralized form, then the acid groups are neutralized preferably to at most 50 mol %, particularly preferably to at most 30 mol %.

Suitable bases for neutralization of the α,β-ethylenically unsaturated carboxylic acids, as well as the unsaturated sulfonic acids and phosphonic acids mentioned below, are alkali metal hydroxides such as NaOH and KOH, alkaline earth metal hydroxides such as $Ca(OH)_2$, $Mg(OH)_2$, ammonia and amine bases. Preferred amines are alkanol-amines such as ethanolamine, diethanolamine and triethanolamine. If desired, a partial or complete neutralization of the acid groups may also be carried out following the polymerization.

Particularly preferably, the monomer A) is selected from acrylic acid, methacrylic acid, maleic acid, fumaric acid, itaconic acid, salts of the aforementioned carboxylic acids and mixtures thereof.

In particular, the monomer A) is selected from acrylic acid, methacrylic acid, salts of acrylic acid, salts of methacrylic acid and mixtures thereof.

In a specific embodiment, exclusively acrylic acid is used as monomer A).

The monomer A) is used preferably in an amount of from 50 to 100% by weight, particularly preferably 60 to 100% by weight, based on the total weight of the monomer composition M).

In a preferred embodiment, the monomer composition M) consists to at least 50% by weight, preferably to at least 80% by weight, in particular to at least 90% by weight, based on the total weight of the monomer composition M), of acrylic acid and/or acrylic acid salts.

Monomer B)

The monomer composition M) can comprise, in addition to the monomers A), at least one monomer B) which is selected from unsaturated sulfonic acids, salts of unsaturated sulfonic acids, unsaturated phosphonic acid, salts of unsaturated phosphonic acids and mixtures thereof.

The monomer B) is preferably selected from 2-acrylamido-2-methylpropanesulfonic acid, vinylsulfonic acid, allylsulfonic acid, sulfoethyl acrylate, sulfoethyl methacrylate, sulfopropyl acrylate, sulfopropyl methacrylate, 2-hydroxy-3-acryloxypropylsulfonic acid, 2-hydroxy-3-methacryloxypropylsulfonic acid, styrenesulfonic acid, vinylphosphonic acid, allylphosphonic acid, salts of the aforementioned acids, and mixtures thereof.

2-Acrylamido-2-methylpropanesulfonic acid is preferred as monomer B).

Suitable salts of the aforementioned acids are in particular the sodium, potassium and ammonium salts, and the salts with amines. The monomers B) can be used as such or as mixtures with one another. The stated weight fractions all refer to the acid form.

Preferably, the monomer composition M) then consists to at least 50% by weight, particularly preferably to at least 80% by weight, in particular to at least 90% by weight, based on the total weight of the monomer composition M), of monomers A) and B). If the monomer composition M) comprises at least one monomer B), then this is used preferably in an amount of from 0.1 to 50% by weight, particularly preferably 1 to 25% by weight, based on the total weight of the monomer composition M).

Further monomers C)

The monomer composition M) can additionally comprise at least one further monomer (monomer C) different from the monomers containing acid groups and salts thereof.

The monomer composition M1) can therefore have the following monomer compositions: A) or A)+B) or A)+C) or A)+B)+C).

Preferably, the monomer composition M) additionally comprises at least one comonomer C) selected from $C_1$) nitrogen heterocycles with a free-radically polymerizable α,β-ethylenically unsaturated double bond, $C_2$) monomers containing amide groups,
$C_3$) compounds of the general formulae (I.a) and (I.b)

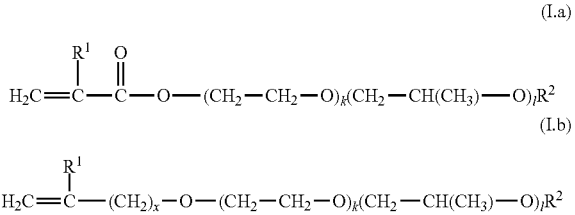

(I.a)

(I.b)

in which
the order of the alkylene oxide units is arbitrary,
x is 0, 1 or 2,
k and l, independently of one another, are an integer from 0 to 100, where the sum of k and l is at least 2, preferably at least 5,
$R^1$ is hydrogen or methyl,
$R^2$ is hydrogen, $C_1$-$C_4$-alkyl,
and mixtures of two or more than two of the aforementioned monomers $C_1$) to $C_3$).

The monomer composition M) can comprise the further monomers $C_1$) to $C_3$) in each case preferably in an amount of from 0 to 30% by weight, particularly preferably 0 to 20% by weight, in particular 0 to 10% by weight, based on the total weight of the monomer composition M). If the monomer composition M) comprises at least one monomer selected from $C_1$) to $C_3$), then in each case preferably in an amount of from 0.1 to 30% by weight, particularly preferably 1 to 20% by weight, in particular 1.5 to 10% by weight, based on the total weight of the monomer composition M). In a specific embodiment, the monomer composition M) comprises no further comonomers apart from the monomers A).

Monomer $C_1$)

Preferred nitrogen heterocycles with a free-radically polymerizable α,β-ethylenically unsaturated double bond $C_1$) are selected from 1-vinylimidazole (N-vinylimidazole), vinyl- and allyl-substituted nitrogen heterocycles different from 1-vinylimidazole, and mixtures thereof.

From the amine nitrogens of the aforementioned compounds it is possible to generate charged cationic groups either by protonation with acids or by quaternization with alkylating agents. Suitable monomers $C_1$) are also the compounds obtained by protonation or quaternization of 1-vinylimidazole and vinyl- and allyl-substituted nitrogen heterocycles different therefrom. Acids suitable for the protonation are e.g. carboxylic acids, such as lactic acid, or mineral acids, such as phosphoric acid, sulfuric acid and hydrochloric acid. Alkylating agents suitable for the quaternization are $C_1$-$C_4$-alkyl halides or di($C_1$-$C_4$-alkyl) sulfates, such as ethyl chloride, ethyl bromide, methyl chloride, methyl bromide, dimethyl sulfate and diethyl sulfate. A protonation or quaternization can generally take place either before or after the polymerization. Preferably, a protonation or quaternization takes place after the polymerization. Examples of such charged monomers $C_1$) are quaternized vinylimidazoles, in particular 3-methyl-1-vinylimidazolium chloride, methosulfate and ethosulfate.

Preferred monomers $C_1$) are furthermore vinyl- and allyl-substituted nitrogen hetero-cycles different from vinylimidazoles selected from 2-vinylpyridine, 4-vinylpyridine, 2-allylpyridine, 4-allylpyridine and the salts thereof obtained by protonation or by quaternization.

In particular, the monomer composition M) comprises at least one comonomer $C_1$) selected from 1-vinylimidazole, 2-vinylpyridine, 4-vinylpyridine, 2-allylpyridine, 4-allylpyridine and the salts thereof obtained by protonation or by quaternization. Specifically, the monomer composition M) comprises 1-vinylimidazole as comonomer $C_1$).

Monomer $C_2$)

Suitable amide-group-containing monomers $C_2$) are compounds of the general formula (II)

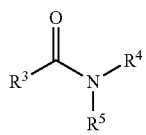

(II)

in which
one of the radicals $R^3$ to $R^5$ is a group of the formula $CH_2=CR^6-$ where $R^6=H$ or $C_1$-$C_4$-alkyl and the other radicals $R^6$ to $R^8$, independently of one another, are H or $C_1$-$C_7$-alkyl,
where $R^3$ and $R^4$, together with the amide group to which they are bonded, can also be a lactam having 5 to 8 ring atoms,
where $R^4$ and $R^5$, together with the nitrogen atom to which they are bonded, can also be a five- to seven-membered heterocycle.

Preferably, the monomers C2) are selected from primary amides of α,β-ethylenically unsaturated monocarboxylic acids, N-vinylamides of saturated monocarboxylic acids, N-vinyllactams, N-alkyl- and N,N-dialkylamides, α,β-ethylenically unsaturated monocarboxylic acids and mixtures thereof.

Preferred monomers C2) are N-vinyllactams and derivatives thereof, which can have, e.g., one or more $C_1$-$C_6$-alkyl substituents, such as methyl, ethyl, n-propyl, isopropyl, n-butyl, sec-butyl, tert-butyl, etc. These include, e.g., N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam and N-vinyl-7-ethyl-2-caprolactam.

Particular preference is given to using N-vinylpyrrolidone and/or N-vinylcaprolactam.

Suitable monomers C2) are furthermore acrylamide and methacrylamide.

N-Alkyl- and N,N-dialkylamides of α,β-ethylenically unsaturated monocarboxylic acids suitable as monomers C2) are, for example, methyl(meth)acrylamide, methylethacrylamide, ethyl(meth)acrylamide, ethylethacrylamide, n-propyl(meth)acrylamide, isopropyl(meth)acrylamide, n-butyl(meth)acrylamide, tert-butyl(meth)acrylamide, tert-butylethacrylamide, and mixtures thereof.

Open-chain N-vinylamide compounds suitable as monomers C2) are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide, N-vinylbutyramide and mixtures thereof. Preference is given to using N-vinylformamide.

Ether-Group-Containing Monomer C3)

The monomer composition M) can additionally comprise at least one monomer C3) selected from compounds of the general formulae (I.a) and (I.b), as defined above.

In the formulae I.a) and I.b), k is preferably an integer from 1 to 100, particularly preferably 2 to 50, in particular 3 to 30. Preferably, l is an integer from 0 to 50.

Preferably, $R^2$ in the formulae I.a) and I.b) is hydrogen, methyl, ethyl, n-propyl, isopropyl, n-butyl, sec-butyl or tert-butyl.

In the formula I.b), x is preferably 1 or 2.

The polymer composition P) comprises essentially uncrosslinked polymers. The monomer composition M) used for producing the polymer composition according to the invention thus comprises in particular no added crosslinking monomers. In the context of the invention, crosslinking monomers are compounds with two or more than two polymerizable ethylenically unsaturated double bonds per molecule.

Specifically, the monomer composition M) comprises, based on the total weight, less than 0.1% by weight, even more specifically less than 0.01% by weight, of crosslinking monomers which have two or more than two free-radically polymerizable α,β-ethylenically unsaturated double bonds per molecule.

In a preferred embodiment, the monomer composition M) comprises no crosslinking monomers which have two or more than two polymerizable α,β-ethylenically unsaturated double bonds per molecule.

($C_8$-$C_{18}$-Alkyl)polyoxyalkylene ether PE)

The washing- and cleaning-active polymer film according to the invention comprises or consists of a polymer composition P) which is obtainable by free-radical polymerization of a monomer composition M), as defined above, in the presence of at least one ($C_8$-$C_{18}$-alkyl)polyoxyalkylene ether PE) having on average 3 to 12 alkylene oxide units per molecule.

Suitable ($C_8$-$C_{18}$-alkyl)polyoxyalkylene ethers PE) are generally compounds of the general formula (III)

$$R^7O-(R^8O)_sR^9 \quad\quad (III)$$

in which
$R^7$ is $C_8$-$C_{18}$-alkyl,
$R^8$ is selected in the repeat units ($R^8O$) in each case independently of one another from

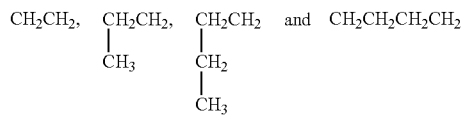

$CH_2CH_2$, $\begin{array}{c}CH_2CH_2\\|\\CH_3\end{array}$, $\begin{array}{c}CH_2CH_2\\|\\CH_2\\|\\CH_3\end{array}$ and $CH_2CH_2CH_2CH_2$ $R^9$ is hydrogen or $C_1$-$C_4$-alkyl, and
s is an integer from 3 to 12.

The $C_8$-$C_{18}$-alkyl radicals of the ($C_8$-$C_{18}$-alkyl)polyoxyalkylene ethers PE) can be derived from the corresponding alcohols, specifically alcohols of the general formula $R^7$—OH by formal elimination of the OH group. The $C_8$-$C_{18}$-alkyl radicals of the ($C_8$-$C_{18}$-alkyl)polyoxyalkylene ethers PE) can be derived from pure alcohols or from alcohol mixtures. Preferably, they are industrially available alcohols or alcohol mixtures.

The $C_8$-$C_{18}$-alkyl radicals of the ($C_8$-$C_{18}$-alkyl)polyoxyalkylene ethers (PE) used according to the invention or the alcohols $R^7$—OH used for their production can also originate from a renewable, natural and/or sustainable source. In the context of the invention, renewable sources are understood as meaning natural (biogenic) and/or sustainable sources and not fossil sources, such as petroleum, natural gas or coal. Suitable ($C_8$-$C_{18}$-alkyl)polyoxyalkylene ethers generally have a number-average molecular weight in the range from about 260 to 1000, preferably 300 to 800.

Suitable ($C_8$-$C_{18}$-alkyl)polyoxyalkylene ethers are water-soluble nonionic polymers which have alkylene oxide repeat units.

The $C_8$-$C_{18}$-alkyl radicals of the ($C_8$-$C_{18}$-alkyl)polyoxyalkylene ethers (PE) used according to the invention or the radicals $R^7$ can be derived from alcohols and alcohol mixtures of native or petrochemical origin having 8 to 18 carbon atoms. The ($C_8$-$C_{18}$-alkyl) radicals or the radicals $R^7$ can be derived from primary, secondary, tertiary or quaternary alcohols. Preferably, the ($C_8$-$C_{18}$-alkyl) radicals and/or the radicals $R^7$ are derived from primary alcohols. The ($C_8$-$C_{18}$-alkyl) radicals of the ($C_8$-$C_{18}$-alkyl)polyoxyalkylene ethers or the radicals $R^7$ can furthermore be straight-chain or branched. Preferably, the ($C_8$-$C_{18}$-alkyl) radicals or the radicals $R^7$ are linear or predominantly linear alkyl radicals. Predominantly linear alkyl radicals are understood as meaning those which have essentially methyl group branches and essentially no longer-chain branches. In a first preferred embodiment, the ($C_8$-$C_{18}$-alkyl) radicals are linear alkyl radicals. In a second preferred embodiment, the ($C_8$-$C_{18}$-alkyl) radicals are predominantly linear alkyl radicals, as also occur in natural or synthetic fatty acids and fatty alcohols, and oxo alcohols. Specifically, the ($C_8$-$C_{18}$-alkyl) radicals can be linear or preferably 2-methyl-branched and/or comprise linear and methyl-branched radicals in a mixture, as are customarily present in oxo alcohol radicals. In a further preferred embodiment, the ($C_8$-$C_{18}$-alkyl) radicals are branched alkyl radicals as they have longer-chain alcohols which are obtained by Guerbet condensation. During the Guerbet condensation, primary or secondary alcohols are condensed at high temperatures and high pressure in the presence of alkali metal hydroxides or alkoxides to give longer-chain alcohols, which are also called Guerbet alcohols. A suitable Guerbet alcohol is a $C_{16}$-$C_{20}$-alcohol that is n-butyl-terminated and alkoxylated with 7 to 8 ethylene oxide groups per molecule.

The $C_8$-$C_{18}$-alkyl radicals of the ($C_8$-$C_{18}$-alkyl)polyoxyalkylene ethers (PE) are preferably $C_{12}$-$C_{18}$-alkyl radicals, for example $C_9$-$C_{16}$-alkyl radicals or $C_{10}$-$C_{14}$-alkyl radicals. In the compounds of the general formula (III), $R^7$ is preferably $C_{12}$-$C_{18}$-alkyl, such as $C_9$-$C_{16}$-alkyl or $C_{10}$-$C_{14}$-alkyl.

Of suitability are ($C_8$-$C_{18}$-alkyl)polyoxyalkylene ethers which are derived from a single alcohol having 12 to 18 carbon atoms, for example having 9 to 16 carbon atoms or having 10 to 14 carbon atoms. These include, for example, coconut, palm, tallow fatty or oleyl alcohol.

Also of suitability are ($C_8$-$C_{18}$-alkyl)polyoxyalkylene ethers which are derived from alcohol mixtures, e.g. selected from $C_{12}C_{14}$-alcohols, $C_9C_{11}$-alcohols, $C_{13}C_{15}$-alcohols, $C_{12}C_{18}$-alcohols and $C_{12}C_{14}$-alcohols.

The ($C_8$-$C_{18}$-alkyl)polyoxyalkylene ethers comprise in the polyoxyalkylene ether group preferably on average 3 to 10, particularly preferably 5 to 9, alkylene oxide units, per mole of alcohol. In the compounds of the general formula (III), s is preferably 3 to 10, in particular 5 to 9.

Suitable alkylene oxides for producing the ($C_8$-$C_{18}$-alkyl) polyoxyalkylene ethers are e.g. ethylene oxide, propylene oxide, epichlorohydrin, 1,2- and 2,3-butylene oxide.

The stated degrees of alkoxylation, specifically degrees of ethoxylation, are statistical averages (number-average, Mn) which can be an integer or a fraction for a specific product. Preferred alcohol ethoxylates have a narrowed homolog distribution (narrow range ethoxylates, NRE).

Suitable polyoxyalkylene ether groups are, for example, homopolymers of ethylene oxide, homopolymers of propylene oxide, copolymers of ethylene oxide and propylene oxide, copolymers of ethylene oxide and butylene oxide, and copolymers of ethylene oxide, propylene oxide and at least one butylene oxide. The polyoxyalkylene ether groups which comprise various alkylene oxides in copolymerized form can comprise the alkylene oxide units in random distribution or in the form of blocks. A specific embodiment is polyoxyalkylene ether groups which comprise ethylene oxide and propylene oxide in copolymerized form. Preferably, in the ethylene oxide/propylene oxide copolymers, the fraction of repeat units derived from ethylene oxide is 40 to 99% by weight. Particular preference is given to ($C_8$-$C_{18}$-alkyl)polyoxyalkylene ethers whose polyoxyalkylene ether group comprises exclusively ethylene oxide repeat units.

The polyether groups of the ($C_8$-$C_{18}$-alkyl)polyoxyalkylene ethers PE) can carry a hydrogen atom at the non-$C_8$-$C_{18}$-alkyl-terminated ends or be terminated with a $C_1$-$C_4$-alkyl group (i.e. terminally capped). In the compounds of the general formula (III), $R^9$ is accordingly H or $C_1$-$C_4$-alkyl. Preferably, $R^9$ is H or methyl. In a particularly preferred embodiment, the polyether groups on the non-$C_8$-$C_{18}$-alkyl-terminated ends carry a hydrogen atom, i.e. $R^9$ is particularly preferably H.

The ($C_8$-$C_{18}$-alkyl)polyoxyalkylene ethers PE) used are preferably alkoxylated, advantageously ethoxylated, in particular primary alcohols having preferably 8 to 18 carbon atoms and on average 3 to 12, preferably 3 to 10, particularly preferably 5 to 9, mol of ethylene oxide (EO) per mole of alcohol, in which the alcohol radical can be linear or preferably 2-methyl-branched and/or can comprise linear and methyl-branched radicals in a mixture, as are customarily present in oxo alcohol radicals.

The ($C_8$-$C_{18}$-alkyl)polyoxyalkylene ethers PE) are preferably selected from:
$C_{12}C_{14}$-fatty alcohols with 3 EO, 5 EO, 7 EO or 9 EO,
$C_9C_{11}$-oxo alcohols with 7 EO,
$C_{13}$-oxo alcohol with 3 EO, 5 EO, 7 EO or 9 EO,
$C_{13}C_{15}$-oxo alcohols with 3 EO, 5 EO, 7 EO or 9 EO,
$C_{12}C_{18}$-fatty alcohols with 3 EO, 5 EO, 7 EO or 9 EO and mixtures thereof,
2-propylheptanol with 3 EO, 4 EO, 5 EO, 6 EO, 7 EO, 8 EO and 9 EO
and mixtures of two or more than two of the aforementioned ethoxylated alcohols.

Preferred mixtures of ethoxylated alcohols are mixtures of $C_{12}C_{14}$-alcohol with 3 EO and $C_{12}C_{18}$-alcohol with 7 Ea Preferred mixtures of ethoxylated alcohols are also mixtures of short-chain alcohol ethoxylates (e.g. 2-propylheptanol with 7 EO) and long-chain alcohol ethoxylates (e.g. $C_{16}C_{18}$-alcohols with 7 EO).

Production of the Polymer Films

The invention further provides a process for producing a polymer film, in which
a) a monomer composition M) is provided which comprises at least one monomer selected from α,β-ethylenically unsaturated carboxylic acids and mixtures which comprise at least one α,β-ethylenically unsaturated carboxylic acid and at least one salt of an α,β-ethylenically unsaturated carboxylic acid,
b) the monomer composition M) provided in step a) is subjected to a free-radical polymerization in the presence of at least one ($C_8$-$C_{18}$-alkyl)polyoxyalkylene ether having 3 to 12 alkylene oxide units per molecule and optionally in the presence of at least one additive,
c) the polymer composition obtained in step b) is converted to a polymer film.

As regards the monomer composition provided in step a), reference is made to the aforementioned suitable and preferred monomers in their entirety.

The free-radical polymerization of the monomer composition M) in step b) is preferably carried out in the feed procedure. Here, in general at least the monomers are metered into the reaction mixture in liquid form. Monomers liquid under the metered addition conditions can be introduced into the reaction mixture without adding a solvent S), otherwise the monomers are used as solution in a suitable solvent S). It goes without saying that monomers present in the solid form may also be used.

The free-radical polymerization for producing the polymer composition P) can take place in the presence of a solvent S) which is selected from water, $C_1$-$C_6$-alkanols, polyols different from PE), their mono- and dialkyl ethers and mixtures thereof. Suitable polyols and mono- and dialkyl ethers thereof also comprise alkylene glycol mono ($C_1$-$C_4$-alkyl) ethers, alkylene glycol di($C_1$-$C_4$-alkyl) ethers, oligoalkylene glycols and mono($C_1$-$C_4$-alkyl) ethers and di($C_1$-$C_4$-alkyl) ethers thereof.

The solvent S) is preferably selected from water, methanol, ethanol, n-propanol, isopropanol, n-butanol, ethylene glycol, ethylene glycol mono($C_1$-$C_4$-alkyl) ethers, ethylene glycol di($C_1$-$C_4$-alkyl) ethers, 1,2-propylene glycol, 1,2-propylene glycol mono($C_1$-$C_4$-alkyl) ethers, 1,2-propylene glycol di($C_1$-$C_4$-alkyl) ethers, glycerol, polyglycerols, oligoalkylene glycols with a number-average molecular weight of less than 1000 g/mol and mixtures thereof.

Suitable oligoethylene glycols are commercially available under the CTFA names PEG-6, PEG-8, PEG-12, PEG-6-32, PEG-20, PEG-150, PEG-200, PEG-400, PEG-7M, PEG-12M and PEG-115M. These include specifically the Pluriol E® brands from BASF SE. Suitable alkylpolyalkylene glycols are the corresponding Pluriol A . . . E® brands from BASF SE.

The solvent S) is particularly preferably selected from water, ethanol, n-propanol, isopropanol, ethylene glycol, diethylene glycol, triethylene glycol, 1,2-propylene glycol, 1,2-dipropylene glycol and mixtures thereof.

In a specific embodiment, the solvent S) used is water or a mixture of water and at least one solvent S) different from water selected from ethanol, n-propanol, isopropanol, ethylene glycol, diethylene glycol, triethylene glycol, 1,2-propylene glycol, 1,2-dipropylene glycol and mixtures thereof.

In a specific embodiment, the free-radical polymerization in step b) takes place in the presence of a solvent S) which consists to at least 50% by weight, preferably to at least 75% by weight, specifically to at least 90% by weight, based on the total weight of the solvent S), of water. In particular, the free-radical polymerization in step c) takes place in the presence of a solvent S) which consists entirely of water.

Preferably, the free-radical polymerization in step b) takes place in feed procedure, where feeds which comprise at least one α,β-ethylenically unsaturated carboxylic acid comprise no solvent S).

The metering rates of the monomer feed/feeds and any further feeds (initiator, chain transfer agent, etc.) are preferably selected such that the polymerization is maintained with the desired conversion rate. The addition of the individual feeds can take place in this connection continuously, periodically, with constant or changing metering rate, essentially simultaneously or with a time differential. Preferably, the addition of all the feeds to the reaction mixture takes place continuously.

Preferably, for the free-radical polymerization, the monomer composition M) and the ($C_8$-$C_{18}$-alkyl)polyoxyalkylene ethers having 3 to 12 alkylene oxide units per molecule are used in a weight ratio of 0.5:1 to 5:1, particularly preferably from 0.7:1 to 3:1.

If a solvent S) is used to produce the polymer composition, the weight ratio of the ($C_8$-$C_{18}$-alkyl)polyoxyalkylene ether PE) to the component S) is preferably in the range from 0.1:1 to 5:1, particularly preferably from 0.5:1 to 3:1.

Preferably, the free-radical polymerization in step b) takes place at a temperature in the range from 20 to 95° C., particularly preferably from 30 to 90° C., in particular from 40 to 80° C.

The free-radical polymerization in step b) can take place in the presence of at least one additive. Suitable additives are, for example, corrosion inhibitors, antifoams and foam inhibitors, dyes, fragrances, thickeners, solubility promoters, organic solvents, electrolytes, antimicrobial active ingredients, antioxidants, UV absorbers and mixtures thereof.

Preferably, the free-radical polymerization in step b) of the process comprises b1) provision of an initial charge which comprises at least some of the ($C_8$-$C_{18}$-alkyl)polyoxyalkylene ether, optionally at least some of the chain transfer agent R) and, if the polymerization takes place in the presence of a solvent S), optionally at least some S);

b2) addition of the monomer composition M) in one or more feeds, and addition of a feed which comprises the radical starter S), dissolved in some of the at least one ($C_8$-$C_{18}$-alkyl)polyoxyalkylene ether and/or the solvent S) and optionally addition of a feed which comprises the quantity of the chain transfer agent R) which is not used in the initial charge, b3) optional post-polymerization of the reaction mixture obtained in step b2).

Usually, the initial charge is heated before adding the feeds to the polymerization temperature with stirring.

Preferably, the individual reactants are added simultaneously in separate feeds, the flow rates of the feeds generally being kept as constant as possible over the addition period.

Preferably, the amount of ($C_8$-$C_{18}$-alkyl)polyoxyalkylene ether PE) in the initial charge (step b1)) is 30 to 100% by weight, particularly preferably 65 to 100% by weight and in particular 80 to 100% by weight, based on the total weight of the ($C_8$-$C_{18}$-alkyl)polyoxyalkylene ether PE) used for the polymerization.

Preferably, the content of solvent S) in the initial charge is at a maximum of 70% by weight, based on the total weight of the feed materials in the prerun. Preferably, the content of solvent in the prerun is at a maximum of 40% by weight, in particular at a maximum of 35% by weight, based on the total weight of the feed materials in the prerun. The amount of solvent generally changes over the entire course of the process only by a few percent by weight. Usually, solvents S) are used which have a boiling point at atmospheric pressure (1 bar) of less than 240° C.

In a specific variant, the initial charge comprises no solvent. This is added only in step b2) via at least one of the feeds. In a very specific variant, no solvent is initially introduced, and no solvent is added over the entire course of the process.

In a further specific variant, the solvent is completely initially charged.

In a further specific variant, the initial charge comprises no chain transfer agent. If a chain transfer agent is used, this is added only in step b2) via at least one of the feeds.

The addition of the feeds in step b2) takes place over a period which is advantageously selected such that the heat of reaction forming during the exothermic polymerization reaction can be dissipated without relatively great technical complexity, e.g. without the use of a reflux condenser. Usually, the addition of the feeds takes place over a period of 1 to 10 hours. Preferably, the addition of the feeds takes place over a period of 2 to 8 hours, particularly preferably over 2 to 6 hours.

In an alternative embodiment, the free-radical polymerization in step b) of the process takes place continuously, e.g. in a tubular reactor. Then, the addition of the monomer composition M), of the ($C_8$-$C_{18}$-alkyl)polyoxyalkylene ether PE), at least one initiator, optionally at least one chain transfer agent R) and optionally at least one solvent S) into the reactor takes place in the form of a liquid stream or preferably at least two liquid streams. In general, the stream comprising the initiator generally also does not comprise the chain transfer agent. If at least two liquid streams are used, then these are usually mixed to give the reaction mixture. The polymerization can take place in one stage or in two or more than two, i.e. in 2, 3, 4, 5 or more stages. In a suitable embodiment, in the case of a multistage polymerization, at least one additional stream is mixed in between at least two of the polymerization stages. This may be a monomer-containing stream, initiator-containing stream, solvent-containing stream, stream containing chain transfer agent, a mixture thereof and/or any desired other material stream.

During the free-radical polymerization, the optionally used solvent and/or any condensation products that are formed are usually not drawn off. That is to say that, during the polymerization, no or only very slight mass transfer within the framework of technical possibilities with the surrounding area usually takes place.

The polymerization can usually take place at ambient pressure or reduced or increased pressure. Preferably, the polymerization is carried out at ambient pressure.

The polymerization generally takes place at constant temperature, but can also be varied as required during the polymerization. Preferably, the polymerization temperature is kept as constant as possible over the entire reaction period, i.e. steps b2) and b3). Depending on which feed materials are used in the process according to the invention, the polymerization temperature usually fluctuates in the range from 20 to 95° C. Preferably, the polymerization temperature moves in the range from 30 to 90° C. and in particular in the range from 40 to 80° C. If the polymerization is not carried out under increased pressure and at least one optional solvent S) has been added to the reaction mixture, the solvent or solvent mixture determines the maximum reaction temperature by virtue of the corresponding boiling temperatures.

The polymerization can take place in the absence or in the presence of an inert gas. Usually, the polymerization is carried out in the presence of an inert gas. Inert gas is generally understood as meaning a gas which, under the stated reaction conditions, does not enter into a reaction with the starting materials involved in the reaction, reagents, solvents or the products which form.

If the polymerization is carried out in the presence of a solvent, then this is selected from the solvents S) described above.

To produce the polymers, the monomers can be polymerized with the help of radical-forming initiators, hereinbelow also referred to as radical starters or starters. Suitable radical starters (initiators) for the free-radical polymerization are in principle all radical starters which are essentially soluble in the reaction medium, as prevails at the time of their addition, and have an adequate activity to start the polymerization at the given reaction temperatures. An individual radical starter or a combination of at least two radical starters can be used in the process according to the invention. In the latter case, the at least two radical starters can be used in a mixture or preferably separately, simultaneously or successively, e.g. at different times in the course of the reaction.

Radical starters for the free-radical polymerization that can be used are the peroxo and/or azo compounds customary for this purpose, for example hydrogen peroxide, alkali metal or ammonium peroxodisulfates (such as e.g. sodium peroxodisulfate), diacetyl peroxide, dibenzoyl peroxide, succinyl peroxide, di-tert-butyl peroxide, tert-butyl peroxybenzoate, tert-butyl peroxypivalate, tert-butyl peroxyneodecanoate, tert-butyl peroxy-2-ethylhexanoate, tert-butyl peroxymaleate, cumene hydroperoxide, diisopropyl peroxydicarbamate, bis(o-toluoyl) peroxide, didecanoyl peroxide, dioctanoyl peroxide, tert-butyl peroctoate, dilauroyl peroxide, tert-butyl perisobutyrate, tert-butyl peracetate, di-tert-amyl peroxide, tert-butyl hydroperoxide, 2,2'-azobisisobutyronitrile, 2,2'-azobis(2-amidinopropane) dihydrochloride (=azobis(2-methylpropionamidine) dihydrochloride), azobis(2,4-dimethylvaleronitrile) or 2,2'-azobis(2-methylbutyronitrile).

Also of suitability are initiator mixtures or redox initiator systems, such as e.g.
ascorbic acid/iron(II) sulfate/sodium peroxodisulfate,
tert-butyl hydroperoxide/sodium disulfite,
tert-butyl hydroperoxide/sodium hydroxymethanesulfinate,
$H_2O_2/Cu^I$.

In the process according to the invention, the amount of initiator system (starter) used fluctuates in the range from 0.01 to 10 pphm, preferably in the range from 0.1 to 5 pphm, particularly preferably in the range from 0.2 to 2 pphm and in particular in the range from 0.3 to 1.5 pphm (parts per hundred monomer=parts by weight per hundred parts by weight of monomer).

In the process according to the invention, the radical starter is generally provided as solution in a solvent which comprises at least one of the aforementioned solvents S) and optionally additionally at least one ($C_8$-$C_{18}$-alkyl)polyoxyalkylene ether PE).

The polymerization can take place without using a chain transfer agent (polymerization chain transfer agent) or in the presence of at least one chain transfer agent. Chain transfer agents is the term generally used to refer to compounds with high transfer constants which increase the rate of chain transfer reactions and thereby bring about a reduction in the degree of polymerization of the resulting polymers. Among the chain transfer agents, a distinction may be made between mono-, bi- or polyfunctional chain transfer agents, depending on the number of functional groups in the molecule which can lead to one or more chain transfer reactions. Suitable chain transfer agents are described, for example, in detail by K. C. Berger and G. Brandrup in J. Brandrup, E. H. Immergut, Polymer Handbook, 3rd ed., John Wiley & Sons, New York, 1989, p. II/81-II/141.

Suitable chain transfer agents are, for example, aldehydes such as formaldehyde, acetaldehyde, propionaldehyde, n-butyraldehyde, isobutyraldehyde.

Furthermore, chain transfer agents that can be used are formic acid, its salts or esters, such as ammonium formate, 2,5-diphenyl-1-hexene, hydroxylammonium sulfate and hydroxylammonium phosphate.

Further suitable chain transfer agents are allyl compounds, such as e.g. allyl alcohol, functionalized allyl ethers, such as allyl ethoxylates, alkylallyl ethers, or glycerol monoallyl ether.

As chain transfer agent, preference is given to using compounds which comprise sulfur in bonded form. Compounds of this type are, for example, inorganic hydrogensulfites, disulfites and dithionites or organic sulfides, disulfides, polysulfides, sulfoxides and sulfones. These include di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, diethanol sulfide, di-t-butyl trisulfide, dimethyl sulfoxide, dialkyl sulfide, dialkyl disulfide and/or diaryl sulfide. Also suitable as polymerization chain transfer agents are thiols (compounds which comprise sulfur in the form of SH groups, also referred to as mercaptans). As chain transfer agents, preference is given to mono-, bi- and polyfunctional mercaptans, mercaptoalcohols and/or mercaptocarboxylic acids. Examples of these compounds are allyl thioglycolates, ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea and alkyl mercaptans such as n-butyl mercaptan, n-hexyl mercaptan or n-dodecyl mercaptan. Examples of bifunctional chain transfer agents which comprise two sulfur atoms in bonded form are bifunctional thiols, such as e.g. dimercaptopropanesulfonic acid (sodium salt), dimercaptosuccinic acid, dimercapto-1-propanol, dimercaptoethane, dimercaptopropane, dimercaptobutane, dimercaptopentane, dimercaptohexane, ethylene glycol bisthioglycolates and butane-diol bisthioglycolate. Examples of polyfunctional chain transfer agents are compounds which comprise more than two sulfurs in bonded form. Examples thereof are trifunctional and/or tetrafunctional mercaptans.

The chain transfer agent is particularly preferably selected from mercaptoethanol, mercaptoacetic acid, mercaptopropionic acid, ethylhexyl thioglycolate and sodium hydrogensulfite.

Preferred chain transfer agents are also hypophosphorous acid (phosphinic acid) and salts of the hypophosphorous acid. A preferred salt of the hypophosphorous acid is the sodium salt.

If a chain transfer agent is used in the process according to the invention, then the amount is usually 1 to 40 pphm ("parts per hundred monomer", i.e. parts by weight based on one hundred parts by weight of monomer composition). Preferably, the amount of chain transfer agent used in the process according to the invention is in the range from 3 to 30 pphm, particularly preferably in the range from 5 to 25 pphm. It is also possible to carry out the polymerization without adding a chain transfer agent.

Usually, the chain transfer agent is added continuously to the polymerization mixture in its entirety via one of the feeds. However, it is also possible to add the chain transfer agent either in its entirety to the initial charge, i.e. before the actual polymerization, or only some of the chain transfer agent is initially introduced into the initial charge and the remainder is added continuously to the polymerization mixture in step b2) via one of the feeds. The addition of the chain transfer agent here can take place with or without solvent S).

The amount of chain transfer agent and the way in which it is added to the reaction mixture have a major influence on the average molecular weight of the polymer composition. If no chain transfer agent or only a small amount of chain transfer agent is used and/or if the addition takes place predominantly before the polymerization, this generally leads to higher average molecular weights of the polymer formed. If, by contrast, a relatively large amount of chain transfer agent is used and/or the addition of the chain transfer agent takes place for the most part during the polymerization (step b2)), this generally leads to a smaller average molecular weight.

In order to prevent or reduce undesirable foam formation during the synthesis, during transport (e.g. when pumping) and storage and also during film production, antifoams and foam inhibitors may be used. In principle, all known foam inhibitors or antifoams are suitable. To be mentioned here are, for example, (1) oil-based systems based on mineral oil or vegetable oil, which may additionally comprise waxes or silica particles, (2) water-based systems in which oil and water are dispersed, (3) silicone-based systems (polysiloxanes), used for example in water-soluble form, as oil or water-based emulsion (4) EO/PO-based polyalkoxylates, (5) alkylpolyacrylates, (6) fatty acids and fatty acid esters, especially mono- and diglycerides of fatty acids, (8) fatty alcohol alkoxylates, (9) antifoams from the class of phosphoric acid esters and salts thereof such as sodium ($C_6$-$C_{20}$-alkyl) phosphates, e.g. sodium octyl phosphate or tri($C_1$-$C_{20}$-alkyl) phosphates, e.g. tributyl phosphate and (10) metal soaps such as aluminum stearate or calcium oleate.

The polysiloxanes (polydimethylsiloxanes) may also be used in modified form, e.g. alkyl group-modified or polyether group-modified. Preference is given to using these.

Preferably, the polymer composition obtained after the end of the polymerization (step b3)) is transferred to a suitable vessel and optionally cooled directly to ambient temperature (20° C.).

The polymer compositions P) obtained in this way are advantageously suitable for producing washing- and cleaning-active polymer films, e.g. as covering of a liquid detergent or cleaner. The production of films and of coverings based thereon is described in more detail below in the context of step c).

The weight-average molecular weight $M_w$ of the polymer composition according to the invention was determined by means of gel permeation chromatography (GPC) in aqueous solution using neutralized polyacrylic acid as polymer standard. In this type of molecular weight determination, the components of the polymer composition are ascertained which comprise the monomers M) in polymerized-in form. The polymer composition P) preferably has a weight-average molecular weight of from 2000 to 100 000 g/mol, preferably from 3000 to 80 000 g/mol.

The polymer composition P) has a sufficiently low glass transition temperature $T_G$ suitable for film formation. Preferably, the polymer compositions P) have a glass transition temperature $T_G$ in the range from 0 to 80° C., particularly preferably from 0 to 60° C., in particular from 0 to 30° C.

Prior to its use for film production (i.e. before it passes through a drying), the polymer composition P) preferably has a content of acid groups of more than 1 mmol/g, particularly preferably of more than 1.3 mmol/g. The polymer composition P) preferably has a content of acid groups of at most 15 mmol/g prior to its use for film production. The polymer composition P) has in particular a content of acid groups of 1.5 mmol/g to 10 mmol/g prior to its use for film production.

In a preferred embodiment, the acid groups of the polymer composition according to the invention are present in non-neutralized form.

In step c) of the process according to the invention, the polymer obtained in step b) is converted to a polymer film.

Accordingly, the invention further provides a process for producing a washing- and cleaning-active polymer film, in which a polymer composition P), optionally following the addition of at least one additive, is subjected to a film formation. The film formation preferably takes place by casting, blow molding, thermoforming or calendering.

As regards suitable and preferred polymer compositions P), reference is made to the previous statements in their entirety.

A specific embodiment is a process for producing a washing- and cleaning-active polymer film according to the invention which comprises at least one additive. Additives may, as described previously, be added as early as during the free-radical polymerization in step b) or during the film formation in step c). Whether the addition takes place as early on as in step b) or only in step c) depends on the type and effect of the particular additive. For the film formation in step c) additives can be added to the polymer composition P) before and/or during the film production.

Some additives can fulfill several functions, e.g. as solvent S) and as plasticizer.

The additive is preferably selected from non-ionic, anionic, cationic and amphoteric surfactants, builders, chelating agents such as methylglycinediacetic acid, glutaminediacetic acid, glutamic acid diacetic acid and citric acid and sodium and potassium salts thereof, bleaches, enzymes, bases, corrosion inhibitors, antifoams, wetting agents, dyes, pigments, fragrances, fillers, tabletting aids, disintegrants, thickeners, solubilizers, organic solvents, electrolytes, pH modifiers, perfume carriers, fluorescers, hydrotropes, antiredeposition agents, optical brighteners, graying inhibitors, antishrink agents, anticrease agents, dye transfer inhibitors, antimicrobial active ingredients, antioxidants, corrosion inhibitors, antistats, ironing aids, hydrophobizing and impregnating agents, antiswell and antislip agents, plasticizers, scavengers, polymers other than the polymer compositions P), agents for modification of gas permeability and water vapor permeability, antistats, glidants, slip agents, UV absorbers and mixtures thereof.

Especially suitable additives are plasticizers, scavengers, further polymers, agents for modifying the gas permeability and water vapor permeability, antistatic agents, lubricants, slip agents, dissolution auxiliaries, dyes, pigments, enzymes, corrosion inhibitors, antifoams, fragrances, thickeners, solubility promoters, solvents, pH adjusting agents, antiredeposition agents, optical brighteners, graying inhibitors, color transfer inhibitors, antimicrobial active ingredients, antioxidants, UV absorbers and mixtures thereof.

In order to make the polymer films according to the invention more flexible, plasticizers can be added to them during production. As a rule, it suffices to use these plasticizers in a limited amount. Preference is given to using 0.5 to 30% by weight, particularly preferably 2 to 20% by weight, in particular 3 to 15% by weight, of plasticizer, based on the mass of the polymer composition P). The plasticizers can be added to the polymer composition before and/or during heating.

Suitable plasticizers are alkyleneamines, alkanolamines, polyols, such as alkylene glycols and oligoalkylene glycols, e.g. 2-methyl-1,3-propanediol, 3-methyl-1,5-pentadiol, hydroxypropylglycerol, neopentyl glycol, alkoxylated glycerol (such as e.g. Voranol® from Dow Chemicals), water-soluble polyesterpolyols (such as e.g. TriRez from Geo Specialty Chemicals) and mixtures thereof. Suitable plasticizers are also polyetherpolyols, which are available under the name Lupranol® from BASF SE. The term "alkyleneamines" refers to condensation products of alkanolamines with ammonia or primary amines, e.g. ethyleneamines are obtained by reaction of monoethanolamine with ammonia in the presence of a catalyst. Here, the following result as main components: ethylenediamine, piperazine, diethylenetriamine and aminoethylethanol-amine.

Preferably, the plasticizers are selected from glycerol, diglycerol, propylene glycols with a weight-average molecular weight of up to 400 g/mol, ethylene glycol, diethylene glycol, triethylene glycol, tetraethylene glycol, sugar alcohols, such as sorbitol, mannitol, xylitol, isomalt, lactitol, isopentyldiol, neopentylglycol, polyethylene glycol, trimethylolpropane, diethylenetriamine, triethylenepentamine, triethanolamine and mixtures thereof.

In order to make the polymer films according to the invention more resistant to aggressive ingredients (such as e.g. chlorine-releasing compounds, as are used in the area of disinfection of water, etc.), so-called "scavengers" (capture molecules) can be added to the film. Suitable scavengers are polyamines, polymeric polyamines, such as polyethyleneimines, poly(amidoamines) and polyamides. Moreover, it is also possible to use ammonium sulfate, primary and secondary amines with a low vapor pressure, such as ethanolamines, amino acid and salts thereof, and also polyamino acid and salts thereof, fatty amines, glucosamines and other aminated sugars. Furthermore, reducing agents, such as sulfites, bisulfites, thiosulfites, thiosulfates, iodides, nitrites and antioxidants such as carbamates, ascorbates and mixtures thereof can be used.

Antifoams which are suitable as additives for the polymer films are those mentioned above.

For the film formation in step c), further additives in the form of polymers can be added to the polymer composition P) before and/or during the film production. Typically, 0.05 to 20% by weight, preferably 0.1 to 15% by weight, particularly preferably 0.2 to 10% by weight, of polymers (based on the polymer composition P) are used. Such additives can simultaneously improve the washing properties of the film, improve the mechanical properties of the film, and increase the resistance of the film to detergent components.

Suitable polymers are e.g. oligosaccharides and polysaccharides, starch, degraded starches (maltodextrins), cellulose ethers, specifically hydroxyethylcellulose, hydroxypropylcellulose, methylcellulose, ethylcellulose, hydroxypropylmethylcellulose, hydroxy-propylethylcellulose, microcrystalline cellulose, inulin, carboxymethylcellulose, e.g. in the form of the sodium salts, alginic acid and alginates, pectin acid and pectins, polyethyleneimines, alkoxylated, in particular ethoxylated polyethyleneimines, graft polymers of vinyl acetate on polyalkylene glycols, in particular on polyethylene glycols, homopolymers of N-vinylpyrrolidone, copolymers of N-vinylpyrrolidone and N-vinyl-imidazole, copolymers of N-vinylpyrrolidone with vinyl acetate and with vinylcapro-lactam, polyalkylene oxides, polyvinyl alcohol, polyvinyl alcohols with fractions of nonhydrolyzed vinyl acetate, thickeners, such as, for example, xanthan gum, guar gum, gelatin, agar-agar and mixtures thereof.

It is further possible to subject at least one surface or both surfaces of the polymer films according to the invention to at least partial coating with at least one additive. A treatment of this kind may serve, for example, to provide the surface with certain properties, such as a non-stick effect, antistatic effect, hydrophilic or hydrophobic properties, etc. Thus, the polymer films can be furnished, for example, with improved release properties, better rolling properties, better slip properties, reduced stickiness, improved compatibility with respect to certain components covered or coated therewith, etc. The application can be carried out, depending on the type and preparation of the additive, by customary methods, e.g. by spraying, dipping, powder coating, etc. Suitable additives for coating the surface of the polymer films according to the invention are, e.g. talc, surfactants such as silicone-containing surfactants, waxes, etc.

In principle, the film production process is not subject to any particular limitations and the person skilled in the art can apply any desired production process known to him on account of his specialist knowledge while using a polymer composition P). The same is true for the production of coverings and coatings based on a film according to the invention. Of particular suitability are casting processes and extrusion processes.

During the production of the films by extrusion, a polymer composition obtainable by the process according to the invention, optionally after the addition of at least one additive, is extruded, blown in a blowing process to give a film or formed in thermoforming processes to give a film and optionally the film thus obtained is converted to a form suitable for the covering or coating of detergent or cleaner portions.

During the production of the films by casting, for example, a polymer composition obtainable by the process according to the invention, optionally after adding at least one additive, is melted or dissolved in a suitable solvent or solvent mixture, the thus obtained flowable polymer composition is cast to give a film and optionally the solvent or solvent mixture is removed by evaporation.

Suitable solvents and solvent mixtures are those described above as component S), to which reference is made here in its entirety. The solvent is particularly preferably selected from water, ethanol, n-propanol, isopropanol, ethylene glycol, diethylene glycol, 1,2-propylene glycol, 1,2-dipropylene glycol and mixtures thereof. In a specific embodiment, the solvent used is water or a mixture of water and at least one solvent different from water, selected from ethanol, n-propanol, isopropanol, ethylene glycol, diethylene glycol, 1,2-propylene glycol, 1,2-dipropylene glycol and mixtures thereof.

The polymer compositions P) are generally thermoplastic and can be subjected to a reshaping by thermoforming (i.e. hot-forming, deep-drawing or vacuum deep-drawing).

A process for producing water-soluble film packagings by a thermoforming process which comprises a hot-forming or deep-drawing step is described in WO 00/55044.

To produce film portions, the film material can be confectioned in a suitable manner, e.g. by cutting into a suitable size and/or folding to form compartments. Then, the edges can be sealed by customary sealing processes, such as hot sealing, liquid sealing or pressure sealing.

Detergents and Cleaners

The washing- and cleaning-active polymer films according to the invention are advantageously suitable for use for the portionwise packaging of detergents and cleaners. They are suitable firstly specifically for producing a covering which comprises solid or liquid or gel-like detergents or cleaners or at least one of their components. The washing- and cleaning-active polymer films according to the invention are furthermore suitable for producing a coating on a solid detergent or cleaner or on at least one solid component thereof. The polymer films dissolve at the start of the particular application (e.g. in the washing and dishwashing water), thus release the ingredients of the detergents and cleaners and contribute in dissolved form, on account of their dispersing, film-inhibiting, emulsifying and surface-active properties, to the washing and cleaning performance to a considerable extent. On account of their washing effect, they are suitable especially for the formulation of detergents and are characterized by a good reflectance during the treatment of soiled fabric.

The detergent or cleaner portions according to the invention comprise, as covering and/or coating, at least one washing- or cleaning-active polymer film according to the invention. In the inside of this covering or coating, the detergent or cleaner portions according to the invention comprise measured amounts of at least one washing-active or cleaning-active composition. In this connection, it is possible that the detergent or cleaner portions comprise only a single washing- or cleaning-active composition. It is also possible that the detergent or cleaner portions according to the invention comprise two or more than two different washing- or cleaning-active compositions. The different compositions can be surrounded by identical or different covering and/or coating. In this connection, at least one of the coverings and/or coatings comprises a washing- or cleaning-active polymer film according to the invention. The different compositions can be different as regards the concentration of the individual components (quantitative) and/or as regards the type of individual components (qualitative). It is particularly preferred that the components are adapted, as regards type and concentration, to the tasks which the active ingredient portion packs have to perform in the washing or cleaning operation.

The washing- and cleaning-active polymer films according to the invention are also advantageously suitable for producing so-called multichamber systems. Multichamber systems have 2, 3, 4, 5 or more than 5 chambers which each comprise a single or more than one component of a detergent or cleaner. In this connection, it may in principle be a single washing- or cleaning-active ingredient, a single auxiliary or any desired mixture of two or more than two active ingredients and/or auxiliaries. The ingredients of the individual chambers may be liquid, gel-like or solid. Multichamber systems are appropriate, for example, for separating from one another components of a detergent or cleaner that are incompatible or not very compatible. Thus, e.g. one chamber can comprise one or more enzymes(s) and another chamber can comprise at least one bleach. Multichamber systems are appropriate for example also in order to facilitate controlled release of a certain component e.g. at a certain time point in the washing or cleaning operation. For this, e.g. film materials of different material thickness can be used. Furthermore, individual chambers can be produced using a polymer film according to the invention and others can be produced using a conventional film different therefrom.

Wherever data relating to the qualitative and quantitative composition of detergents and cleaners is given hereinbelow, this should always comprise the entire formulation of polymer film and covered or coated components. In the case of a formulation of this composition as multichamber system, the chambers can in each case comprise one individual or several components of the formulation or the total amount of one component can be divided between two or more than two chambers.

The detergent or cleaner portions according to the invention comprise at least one washing- or cleaning-active composition in the inside. These compositions may be any desired substances or substance mixtures relevant in connection with a washing or cleaning operation. These are primarily the actual detergents or cleaners with their individual components explained in more detail below.

In the context of the present invention, detergents are understood here as meaning those products which are used for the cleaning of flexible materials with high absorbency, e.g. of materials with a textile character, whereas cleaners in the context of the present invention are understood as meaning those products which are used for the cleaning of materials with a closed surface, i.e. with a surface which has no or only few and small pores and consequently has only low absorbency, if any.

Examples of flexible materials with high absorbency are those which comprise natural, synthetic or semisynthetic fiber materials or consist thereof and which accordingly generally have at least partially a textile character. The materials containing or consisting of fibers can in principle be present in any form occurring in use or in production and processing. For example, fibers can be present in an unarranged manner in the form of flocks or heaps, arranged in the form of threads, yarns, twines, or in the form of sheet structures such as nonwovens, loden materials or felt, wovens, knits in all conceivable types of binding. The fibers may be raw fibers or fibers in any desired stages of processing. Examples are natural protein or cellulose fibers, such as wool, silk, cotton, sisal, hemp or coconut fibers, or synthetic fibers such as, for example, polyester, polyamide or polyacrylonitrile fibers.

Example of materials which have no pores or only a few small pores and have no or only low absorbency are metal, glass, enamel or ceramic. Typical objects made of these materials are e.g. metallic sinks, cutlery, glass and porcelain dishes, bathtubs, washbasins, tiles, flags, cured synthetic resins, such as e.g. decorative melamine resin surfaces on kitchen furniture or painted metal surfaces such as e.g. refrigerators and car bodies, printed circuit boards, microchips, sealed or painted woods, e.g. parquet or wall claddings, window frames, doors, coverings made of plastic such as floor coverings made of PVC or hard rubber, or rigid or flexible foams with largely closed surfaces.

Examples of cleaners which can comprise the washing- and cleaning-active polymer film according to the invention comprise detergents and cleaners, dishwashing detergents, such as hand dishwashing detergents or machine dishwashing detergents (dishwashing compositions for the dishwasher), metal degreasers, glass cleaners, floor cleaners, all-purpose cleaners, high-pressure cleaners, neutral cleaners, alkaline cleaners, acidic cleaners, spray degreasers, dairy cleaners, commercial kitchen cleaners, apparatus cleaners in industry, especially the chemical industry, cleaners for car washing and also household all-purpose cleaners.

The detergents or cleaners according to the invention may be portions, packaged in bags, of solid, liquid or gel-like detergents or cleaners. In a specific embodiment, they are so-called pouches (liquid tabs). Furthermore, they may be compressed moldings, such as tablets ("tabs"), blocks, briquettes, etc. In a specific embodiment, they are tablet-shaped detergents or cleaners.

The detergent or cleaner according to the invention preferably comprises the following constituents:

A) at least covering and/or coating comprising or consisting of a washing- and cleaning-active polymer film according to the invention, B) at least one surfactant, C) optionally at least one builder, D) optionally at least one bleach system, E) optionally at least one further additive, which is preferably selected from enzymes, bases, corrosion inhibitors, antifoams, dyes, fragrances, fillers, tableting auxiliaries, disintegrants, thickeners, solubility promoters, organic solvents, electrolytes, pH adjusting agents, perfume carriers, fluorescent agents, hydrotropes, antiredeposition agents, optical brighteners, graying inhibitors, shrink preventers, anticrease agents, color transfer inhibitors, antimicrobial active ingredients, antioxidants, corrosion inhibitors, antistats, ironing aids, phobicization and impregnation agents, swelling and slip-resist agents and UV absorbers, and F) optionally water.

In the context of the present invention, the builder C) also comprises compounds referred to as sequestrants, builder, complexing agent, chelator, chelating agent or softener.

The bleach systems D) comprise, besides bleaches, optionally also bleach activators, bleach catalysts and/or bleach stabilizers.

Particularly preferably, the detergent and cleaner according to the invention comprises at least one enzyme as additive E).

A preferred embodiment relates to liquid or gel-like detergents or cleaners comprising: A) 0.1 to 20% by weight of at least one covering and/or coating, comprising or consisting of a washing- and cleaning-active polymer film according to the invention, B) 1 to 80% by weight of at least one surfactant,
C) 0.1 to 50% by weight of at least one builder,
D) 0 to 20% by weight of a bleach system,
E) 0.1 to 60% by weight of at least one further additive, which is preferably selected from enzymes, bases, corrosion inhibitors, antifoams, dyes, fragrances, fillers, tableting auxiliaries, disintegrants, thickeners, solubility promoters, organic solvents, electrolytes, pH adjusting agents, perfume carriers, fluorescent agents, hydrotropes, antiredeposition agents, optical brighteners, graying inhibitors, shrink preventers, anticrease agents, color transfer inhibitors, antimicrobial active ingredients, antioxidants, corrosion inhibitors, antistats, ironing aids, phobicization and impregnation agents, swelling and slip-resist agents and UV absorbers, and F) 0 to 98.7% by weight of water.

The percent by weight data refer here to the total weight of the detergent and cleaner. The weight amounts of A) to F) add up to 100% by weight.

Preferably, the liquid or gel-like detergents or cleaners comprise up to 70% by weight of water, particularly preferably up to 50% by weight of water, in particular up to 30% by weight of water.

A further preferred embodiment relates to solid detergents or cleaners comprising:

A) 0.1 to 20% by weight of at least one covering and/or coating, comprising or consisting of a washing- and cleaning-active polymer film according to the invention,
B) 1 to 50% by weight of at least one surfactant,
C) 0.1 to 70% by weight of at least one builder,
D) 0 to 30% by weight of a bleach system,
E) 0.1 to 70% by weight of at least one further additive, which is preferably selected from enzymes, bases, corrosion inhibitors, antifoams, dyes, fragrances, fillers, tableting auxiliaries, disintegrants, thickeners, solubility promoters, organic solvents, electrolytes, pH adjusting agents, perfume carriers, fluorescent agents, hydrotropes, antiredeposition agents, optical brighteners, graying inhibitors, shrink preventers, anticrease agents, color transfer inhibitors, antimicrobial active ingredients, antioxidants, corrosion inhibitors, antistats, ironing aids, phobicization and impregnation agents, swelling and slip-resist agents and UV absorbers, and optionally water.

The percent by weight data refer here to the total weight of the detergent and cleaner.

The weight amounts of A) to F) add up to 100% by weight.

Component A)

As regards suitable and preferred washing- and cleaning-active polymer films according to the invention, reference is made to the statements above.

Component B)

The detergents and cleaners according to the invention comprise as component B) at least one surfactant. Suitable surfactants B) are nonionic, anionic, cationic or amphoteric surfactants.

In the context of the present invention, surfactants B) that can be used are, for example, nonionic surfactants (NIS). The nonionic surfactants used are preferably alkoxylated alcohols. Preference is given to alkoxylated primary alcohols. Preferred alkoxylated alcohols are ethoxylated alcohols having preferably 8 to 18 carbon atoms in the alkyl radical and on average 1 to 12 mol of ethylene oxide (EO) per mole of alcohol. The alcohol radical can be linear or preferably 2-methyl-branched and can comprise linear and methyl-branched radicals in a mixture, as are customarily present in oxo alcohol radicals. Particular preference is given to alcohol ethoxylates with linear or branched radicals from alcohols of native or petrochemical origin having 12 to 18 carbon atoms, for example from coconut, palm, tallow fatty or oleyl alcohol, and on average 2 to 8 EO per mole of alcohol.

The ethoxylated alcohols are preferably selected from:
$C_{12}C_{14}$-alcohols with 3 EO, 5 EO, 7 EO or 9 EO,
$C_9C_{11}$-alcohols with 7 EO,
$C_{13}$-oxo alcohols with 3 EO, 5 EO, 7 EO or 9 EO,
$C_{13}C_{15}$-alcohols with 3 EO, 5 EO, 7 EO or 9 EO,
$C_{12}C_{18}$-alcohols with 3 EO, 5 EO, 7 EO or 9 EO and mixtures thereof,
2-propylheptanol with 3 EO, 4 EO, 5 EO, 6 EO, 7 EO, 8 EO and 9 EO
and mixtures of two or more than two of the aforementioned ethoxylated alcohols.

A preferred mixture of nonionic surfactants is a mixture of $C_{12}C_{14}$-alcohol (lauryl alcohol/myristyl alcohol) with 3 EO and $C_{12}C_{18}$-alcohol (lauryl alcohol/myristyl alcohol/cetyl alcohol/stearyl alcohol) with 7 EO. Preference is also given to mixtures of short-chain alcohol ethoxylates (e.g. 2-propylheptanol with 7 EO) and long-chain alcohol ethoxylates (e.g. $C_{16}C_{18}$ with 7 EO).

The stated degrees of ethoxylation are statistical averages (number averages, Mn), which may be an integer or a fraction for a specific product. Preferred alcohol ethoxylates have a narrowed homolog distribution (narrow range ethoxylates, NRE). In addition to these nonionic surfactants, it is also possible to use fatty alcohols with more than 12 EO. Examples thereof are tallow fatty alcohol with 14 EO, 25 EO, 30 EO or 40 EO. Nonionic surfactants which comprise ethylene oxide (EO) and propylene oxide (PO) groups together in the molecule can also be used. In this connection, it is possible to use block copolymers with EO-PO block units or PO-EO block units, but also EO-PO-EO copolymers or PO-EO-PO copolymers. It is of course also possible to use mixed alkoxylated nonionic surfactants in which EO and PO units are not blockwise but randomly distributed. Such products are obtainable by the simultaneous action of ethylene oxide and propylene oxide on fatty alcohols.

Surfactants suitable as component B) are also polyetherols, preferably with a number-average molecular weight of at least 200 g/mol.

Suitable polyetherols can be linear or branched, preferably linear. Suitable polyetherols have generally a number-average molecular weight in the range from about 200 to 100 000, preferably 300 to 50 000, particularly preferably 500 to 40 000. Suitable polyetherols are, for example, water-soluble or water-dispersible nonionic polymers which have alkylene oxide repeat units. Preferably, the fraction of alkylene oxide repeat units is at least 30% by weight, based on the total weight of the compound. Suitable polyetherols are polyalkylene glycols, such as polyethylene glycols, polypropylene glycols, polytetrahydrofurans and alkylene oxide copolymers. Suitable alkylene oxides for producing alkylene oxide copolymers are e.g. ethylene oxide, propylene oxide, epichlorohydrin, 1,2- and 2,3-butylene oxide. Of suitability are, for example, copolymers of ethylene oxide and propylene oxide, copolymers of ethylene oxide and butylene oxide, and copolymers of ethylene oxide, propylene oxide and at least one butylene oxide. The alkylene oxide copolymers can comprise the polymerized-in alkylene oxide units in randomly distributed form or in the form of blocks. Preferably, the fraction of repeat units derived from ethylene oxide in the ethylene oxide/propylene oxide copolymers is 40 to 99% by weight. Particular preference is given to ethylene oxide homopolymers and ethylene oxide/propylene oxide copolymers.

Moreover, further nonionic surfactants that can be used are also alkyl glycosides of the general formula (IV)

$$R^{10}O(G)_i \qquad (IV)$$

in which $R^{10}$ is a primary straight-chain or methyl-branched aliphatic radical having 8 to 22 carbon atoms, G is a glycoside unit having 5 or 6 carbon atoms, and i is any desired number between 1 and 10.

In the compounds of the formula (IV), $R^{10}$ is preferably a 2-methyl-branched aliphatic radical having 8 to 22, preferably 12 to 18 carbon atoms.

G is preferably glucose.

The degree of oligomerization i, which indicates the distribution of monoglycosides and oligoglycosides, is preferably in a range from 1.2 to 1.4.

A further class of nonionic surfactants used with preference in the context of the present invention and which are used either as the sole nonionic surfactant or in combination with other nonionic surfactants are alkoxylated, preferably ethoxylated or ethoxylated and propoxylated fatty acid alkyl esters, preferably having 1 to 4 carbon atoms in the alkyl chain. Particular preference is given to fatty acid methyl esters, as are described, for example, in the Japanese patent application JP 58/217598, or which are produced preferably in accordance with the process described in the International patent application WO 90/13533.

Also suitable as nonionic surfactants are amine oxides, for example N-cocoalkyl-N,N-dimethylamine oxide and N-tallowalkyl-N,N-dihydroxyethylamine oxide, and fatty acid alkanolamides. These nonionic surfactants are preferably used as a mixture with alkoxylated alcohols. Preference is given to the mixture with ethoxylated fatty alcohols. The weight amount of these nonionic surfactants is preferably not more than that of the ethoxylated fatty alcohols, in particular not more than half thereof.

Further suitable surfactants B) are polyhydroxy fatty acid amides of the formula (V)

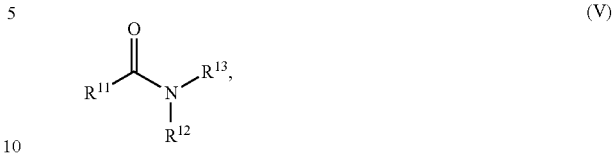

in which the group $R^{11}$—C(=O) is an aliphatic acyl radical having 6 to 22 carbon atoms, $R^{12}$ is hydrogen, an alkyl radical with 1 to 4 carbon atoms or a hydroxyalkyl radical having 1 to 4 carbon atoms, and $R^{13}$ is a linear or branched polyhydroxyalkyl radical having 3 to 10 carbon atoms and 3 to 10 hydroxyl groups. The polyhydroxy fatty acid amides are known substances which can usually be obtained by reductive amination of a reducing sugar with ammonia, an alkylamine or an alkanolamine and subsequent acylation with a fatty acid, a fatty acid alkyl ester or a fatty acid chloride. The group of polyhydroxy fatty acid amides include in this connection also compounds of the formula (VI)

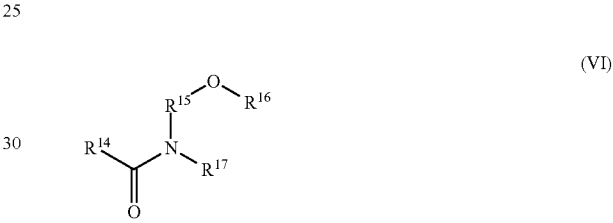

in which $R^{14}$ is a linear or branched alkyl or alkenyl radical having 7 to 12 carbon atoms, $R^{15}$ is a linear, branched or cyclic alkylene radical having 2 to 8 carbon atoms or an arylene radical having 6 to 8 carbon atoms, and $R^{16}$ is a linear, branched or cyclic alkyl radical or an aryl radical or an oxyalkyl radical having 1 to 8 carbon atoms, where $C_1$-$C_4$-alkyl or phenyl radicals are preferred, and $R^{17}$ is a linear polyhydroxyalkyl radical whose alkyl chain is substituted with at least two hydroxyl groups, or alkoxylated, preferably ethoxylated or propoxylated derivatives of this radical. $R^{17}$ is preferably obtained by a reductive amination of a sugar, for example glucose, fructose, maltose, lactose, galactose, mannose or xylose. The N-alkoxy- or N-aryloxy-substituted compounds can then be converted to the desired polyhydroxy fatty acid amides for example in accordance with WO 95/07331 by reaction with fatty acid methyl esters in the presence of an alkoxide as catalyst.

Suitable surfactants B) are also anionic surfactants. Typical examples of anionic surfactants are soaps, alkylsulfonates, alkylbenzenesulfonates, olefinsulfonates, methyl ester sulfonates, sulfo fatty acids, alkyl sulfates, mono- and dialkyl sulfosuccinates, mono- and dialkyl sulfosuccinamates, sulfotriglycerides, amide soaps, ethercarboxylic acids and salts thereof, fatty acid isethionates, fatty acid sarcosinates, fatty acid taurides, N-acylamino acids, such as, for example, acyl lactylates, acyl tartrates, acyl glutamates and acyl aspartates, alkyl oligoglucoside sulfates, alkylglucose carboxylates, protein fatty acid condensates and alkyl (ether) phosphates.

A first preferred embodiment is anionic surfactants of the sulfonate and sulfate types. Preferred surfactants of the sulfonate type are $C_9$-$C_{13}$-alkylbenzenesulfonates, olefinsulfonates, i.e. mixtures of alkene- and hydroxyalkanesulfonates, and also disulfonates, as are obtained, for example, from $C_{12}$-$C_{18}$-monoolefins with terminal or pendent double bond by sulfonation with gaseous sulfur trioxide and subsequent alkaline or acidic hydrolysis of the sulfonation products. Also of suitability are alkane-sulfonates, which are obtained from $C_{12}$-$C_{18}$-alkanes for example by sulfochlorination or sulfoxidation with subsequent hydrolysis and/or neutralization. Likewise of suitability are also the esters of α-sulfo fatty acids (estersulfonates), for example the α-sulfonated methyl esters of hydrogenated coconut, palm kernel or tallow fatty acids. Further suitable anionic surfactants are sulfated fatty acid glycerol esters. Fatty acid glycerol esters are to be understood as meaning, inter alia, the mono-, di- and triesters, and mixtures thereof, as are obtained during the production by esterification of a mono-glycerol with 1 to 3 mol of fatty acid or during the transesterification of triglycerides with 0.3 to 2 mol of glycerol. Preferred sulfated fatty acid glycerol esters here are the sulfation products of saturated fatty acids having 6 to 22 carbon atoms, for example of caproic acid, caprylic acid, capric acid, myristic acid, lauric acid, palmitic acid, stearic acid or behenic acid.

Preferred alk(en)yl sulfates are the alkali metal and in particular the sodium salts of the sulfuric acid half-esters of $C_{12}$-$C_{18}$-fatty alcohols, for example of coconut fatty alcohol, tallow fatty alcohol, lauryl, myristyl, cetyl or stearyl alcohol or of the $C_{10}$-$C_{20}$-oxo alcohols and the half-esters of secondary $C_{19}$-$C_{29}$-alcohols. Preference is furthermore given to alk(en)yl sulfates which comprise a synthetic straight-chain $C_{10}$-$C_{29}$-alkyl radical produced on a petrochemical basis. These have an analogous degradation behavior to the equivalent compounds based on fatty chemical raw materials. From the point of view of washing, the $C_{12}$-$C_{16}$-alkyl sulfates and $C_{12}$-$C_{15}$-alkyl sulfates and $C_{14}$-$C_{15}$-alkyl sulfates are preferred. 2,3-Alkyl sulfates, which are prepared for example in accordance with the U.S. patent specifications U.S. Pat. No. 3,234,258 or 5,075,041 and can be obtained as commercial products of the Shell Oil Company under the name DAN®, are also suitable anionic surfactants. The sulfuric acid monoesters of the straight-chain or branched $C_7$-$C_{21}$-alcohols ethoxylated with 1 to 6 mol of ethylene oxide, such as 2-methyl-branched $C_9$-$C_{11}$-alcohols having on average 3.5 mol of ethylene oxide (EO) or $C_{12}$-$C_{18}$-fatty alcohols having 1 to 4 EO, inter alia, are also suitable. They are usually used in cleaners only in relatively small amounts, for example in amounts from 1 to 5% by weight, on account of their high foam behavior. Further suitable anionic surfactants in the context of the present invention are also the salts of alkylsulfosuccinic acid, which are also referred to as sulfosuccinates or as sulfosuccinic acid esters and are the monoesters and/or diesters of sulfosuccinic acid with alcohols, preferably fatty alcohols and in particular ethoxylated fatty alcohols. Preferred sulfosuccinates comprise $C_8$-$C_{18}$-fatty alcohol radicals or mixtures of these. Particularly preferred sulfosuccinates comprise a fatty alcohol radical which is derived from ethoxylated fatty alcohols. Here, in turn sulfosuccinates whose fatty alcohol radicals are derived from ethoxylated fatty alcohols with a narrow homolog distribution are particularly preferred. It is likewise also possible to use alk(en)ylsuccinic acid having preferably 8 to 18 carbon atoms in the alk(en)yl chain or salts thereof.

Particularly preferred anionic surfactants are soaps. Of suitability are saturated and unsaturated fatty acid soaps, such as the salts of lauric acid, myristic acid, palmitic acid, stearic acid, (hydrogenated) erucic acid and behenic acid, and also in particular soap mixtures derived from natural fatty acids, for example coconut, palm kernel, olive oil or tallow fatty acids.

The anionic surfactants including the soaps can be present in the form of their sodium, potassium or ammonium salts, and also as soluble salts of organic bases, such as mono-, di- or triethanolamine. Preferably, the anionic surfactants are present in the form of their sodium or potassium salts, in particular in the form of the sodium salts.

Suitable surfactants B) are also cationic surfactants. Particularly preferred cationic surfactants are:

$C_7$-$C_{25}$-alkylamines;

N,N-dimethyl-N-(hydroxy-$C_7$-$C_{25}$-alkyl)ammonium salts;

mono- and di($C_7$-$C_{25}$-alkyl)dimethylammonium compounds quaternized with alkylating agents;

ester quats, in particular quaternary esterified mono-, di- and trialkanolamines esterified with $C_8$-$C_{22}$-carboxylic acids;

imidazoline quats, in particular 1-alkylimidazolinium salts of the formulae VII or VIII

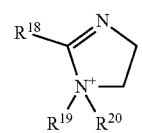

(VII)

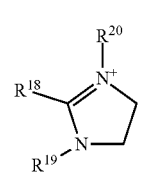

(VIII)

where the variables have the following meaning:
$R^{18}$ is $C_1$-$C_{25}$-alkyl or $C_2$-$C_{25}$-alkenyl,
$R^{19}$ is $C_1$-$C_4$-alkyl or hydroxy-$C_1$-$C_4$-alkyl,
$R^{20}$ is $C_1$-$C_4$-alkyl, hydroxy-$C_1$-$C_4$-alkyl or a radical $R^{21}$—(CO)—$R^{22}$—(CH$_2$)$_r$—, where $R^{21}$ is H or $C_1$-$C_4$-alkyl, $R^{21}$ is —O— or —NH— and r is 2 or 3,
where at least one radical $R^{18}$ is a $C_7$-$C_{22}$-alkyl radical.

The surfactants B) can also be amphoteric surfactants. Suitable amphoteric surfactants are alkylbetaines, alkylamidobetaines, alkylsulfobetaines, aminopropionates, aminoglycinates and amphoteric imidazolium compounds. For example, it is possible to use cocodimethylsulfopropylbetaine, laurylbetaine, cocamidopropylbetaine, sodium cocamphopropionate or tetradecyldimethylamine oxide.

The content of surfactants in liquid and gel-like detergent and cleaner compositions is preferably 2 to 75% by weight and in particular 5 to 65% by weight, in each case based on the total composition.

The content of surfactants in solid detergent and cleaner compositions is preferably 2 to 40% by weight and in particular 5 to 35% by weight, in each case based on the total composition.

Component C

Builders, which are sometimes also referred to as sequestrants, builder material, complexing agent, chelator, chelating agent or softener, bind alkaline earth metals and other water-soluble metal salts without precipitating. They help to break up dirt, disperse dirt particles, help dirt to dissolve and sometimes have their own washing effect.

Suitable builders can either be organic or inorganic in nature. Examples are alumosilicates, carbonates, phosphates and polyphosphates, polycarboxylic acids, polycarboxylates, hydroxycarboxylic acids, phosphonic acids, e.g. hydroxyalkylphosphonic acids, phosphonates, aminopolycarboxylic acids and salts thereof and polymeric compounds containing carboxylic acid groups, and salts thereof.

Suitable inorganic builders are, for example, crystalline or amorphous alumosilicates with ion-exchanging properties, such as zeolites. Different types of zeolites are suitable, in particular zeolites A, X, B, P, MAP and HS in their Na form or in forms in which Na is in part exchanged for other cations such as Li, K, Ca, Mg or ammonium. Suitable zeolites are described for example in U.S. Pat. No. 4,604,224. Crystalline silicates suitable as builders are, for example, disilicates or sheet silicates, e.g. 5-$Na_2Si_2O_5$ or B—$Na_2Si_2O_5$ (SKS 6 or SKS 7). The silicates can be used in the form of their alkali metal, alkaline earth metal or ammonium salts, preferably as Na, Li and Mg silicates. Amorphous silicates, such as, for example, sodium metasilicate, which has a polymeric structure, or amorphous disilicate (Britesil® H 20 manufacturer: Akzo) can likewise be used. Among these, preference is given to sodium disilicate.

Suitable inorganic builder substances based on carbonate are carbonates and hydrogencarbonates. These can be used in the form of their alkali metal, alkaline earth metal or ammonium salts. Preference is given to using Na, Li and Mg carbonates and hydrogencarbonates, in particular sodium carbonate and/or sodium hydrogencarbonate.

Customary phosphates used as inorganic builders are alkali metal orthophosphates and/or polyphosphates, such as e.g. pentasodium triphosphate.

Suitable organic builders are, for example, $C_4$-$C_{30}$-di-, -tri- and -tetracarboxylic acids, such as e.g. succinic acid, propanetricarboxylic acid, butanetetracarboxylic acid, cyclopentanetetracarboxylic acid and alkyl- and alkenylsuccinic acids with $C_2$-$C_{20}$-alkyl or -alkenyl radicals.

Suitable organic builders are also hydroxycarboxylic acids and polyhydroxycarboxylic acids (sugar acids). These include $C_4$-$C_{20}$-hydroxycarboxylic acids such as e.g. malic acid, tartaric acid, gluconic acid, mucic acid, lactic acid, glutaric acid, citric acid, tartronic acid, glucoheptonic acid, lactobionic acid and sucrosemono-, -di- and -tricarboxylic acid. Among these, preference is given to citric acid and salts thereof.

Suitable organic builders are also phosphonic acids, such as e.g. hydroxyalkylphosphonic acids, aminophosphonic acids and the salts thereof. These include e.g. phosphonobutanetricarboxylic acid, aminotrismethylenephosphonic acid, ethylene-diaminetetraethylenephosphonic acid, hexamethylenediaminetetramethylene-phosphonic acid, diethylenetriaminepentamethylenephosphonic acid, morpholino-methanediphosphonic acid, 1-hydroxy-$C_1$- to $C_{10}$-alkyl-1,1-diphosphonic acids such as 1-hydroxyethane-1,1-diphosphonic acid. Among these, preference is given to 1-hydroxyethane-1,1-diphosphonic acid and salts thereof.

Suitable organic builders are also aminopolycarboxylic acids, such as nitrilotriacetic acid (NTA), nitrilomonoaceticdipropionic acid, nitrilotripropionic acid, β-alaninediacetic acid (β-ADA), ethylenediaminetetraacetic acid (EDTA), diethylenetriaminepentaacetic acid, 1,3-propylenedianninetetraacetic acid, 1,2-propylenedianninetetraacetic acid, N-(alkyl)-ethylenediaminetriacetic acid, N-(hydroxyalkyl)-ethylenediaminetriacetic acid, ethylenediaminetriacetic acid, cyclohexylene-1,2-diaminetetraacetic acid, iminodisuccinic acid, hydroxyiminodisuccinic acid, ethylenediaminedisuccinic acid, serine-diacetic acid, isoserinediacetic acid, L-asparaginediacetic acid, L-glutaminediacetic acid, methylglycinediacetic acid (MGDA) and the salts of the aforementioned aminopolycarboxylic acids, in particular the Na and K salts. Preference is given to methylglycinediacetic acid, the Na and K salts of methylglycinediacetic acid, glutaminediacetic acid and the Na and K salts of glutaminediacetic acid. The salts of methylglycinediacetic acid can be present as racemate, i.e. D- and L-enantiomers are present in equimolar mixture, or one enantiomer, e.g. the L-enantiomer, can be present in excess.

Suitable organic builders are also polymeric compounds containing carboxylic acid groups such as acrylic acid homopolymers. These preferably have a number-average molecular weight in the range from 800 to 70 000 g/mol, particularly preferably 900 to 50 000 g/mol, in particular 1000 to 20 000 g/mol, specifically 1000 to 10 000 g/mol. In this context, the term acrylic acid homopolymer also comprises polymers in which the carboxylic acid groups are present in partially or completely neutralized form. These include acrylic acid homopolymers in which the carboxylic acid groups are present partly or completely in the form of alkali metal salts or ammonium salts. Preference is given to acrylic acid homopolymers in which the carboxylic acid groups are present partly or completely in the form of sodium salts.

Suitable polymeric compounds containing carboxylic acid groups are also oligomaleic acids, as described for example in EP-A 451 508 and EP-A 396 303.

Suitable polymeric compounds containing carboxylic acid groups are also terpolymers of unsaturated $C_4$-$C_8$-dicarboxylic acids, where monoethylenically unsaturated monomers from the group (i) mentioned below in amounts of up to 95% by weight, from the group (ii) in amounts of up to 60% by weight and from the group (iii) in amounts of up to 20% by weight, can be polymerized-in as comonomers. Suitable unsaturated $C_4$-$C_8$-dicarboxylic acids here are, for example, maleic acid, fumaric acid, itaconic acid and citraconic acid. Preference is given to maleic acid. The group (i) comprises monoethylenically unsaturated $C_3$-$C_8$-monocarboxylic acids, such as e.g. acrylic acid, methacrylic acid, crotonic acid and vinylacetic acid. From the group (i), preference is given to using acrylic acid and methacrylic acid. The group (ii) comprises monoethylenically unsaturated $C_2$-$C_{22}$-olefins, vinyl alkyl ethers with $C_1$-$C_8$-alkyl groups, styrene, vinyl esters of $C_1$-$C_8$-carboxylic acids, (meth)acrylamide and vinylpyrrolidone. From the group (ii), preference is given to using $C_2$-$C_6$-olefins, vinyl alkyl ethers with $C_1$-$C_4$-alkyl groups, vinyl acetate and vinyl propionate. If the polymers of group (ii) comprise vinyl esters in polymerized-in form, these may also be present partly or completely hydrolyzed to give vinyl alcohol structural units. Suitable co- and terpolymers are known for example from U.S. Pat. No. 3,887,806, and DE-A 4313909. The group (iii) comprises (meth)acrylic esters of $C_1$-$C_5$-alcohols, (meth)acrylonitrile, (meth)acrylamides of $C_1$-$C_5$-amines, N-vinylformamide and N-vinylimidazole.

Suitable polymeric compounds containing carboxylic acid groups are also homopolymers of the monoethylenically unsaturated $C_3$-$C_8$-monocarboxylic acids, such as e.g. acrylic acid, methacrylic acid, crotonic acid and vinylacetic acid, in particular of acrylic acid and methacrylic acid, copolymers of dicarboxylic acids, such as e.g. copolymers of maleic acid or itaconic acid and acrylic acid in the weight ratio 10:90 to 95:5, particularly preferably those in the weight ratio 30:70 to 90:10 with molar masses from 1000 to 150 000; terpolymers of maleic acid, acrylic acid and a vinyl ester of a $C_1$-$C_3$-carboxylic acid in the weight ratio 10 (maleic acid):90 (acrylic acid+vinyl ester) to 95 (maleic acid):10 (acrylic acid+vinyl ester), where the weight ratio of acrylic acid to the vinyl ester can vary in the range from 30:70 to 70:30; copolymers of maleic acid with $C_2$-$C_8$-olefins in the molar ratio 40:60 to 80:20, where copolymers of maleic acid with ethylene, propylene, isobutene or styrene in the molar ratio 50:50 are particularly preferred.

Suitable polymeric compounds containing carboxylic acid groups are also copolymers of 50 to 98% by weight of ethylenically unsaturated weak carboxylic acids with 2 to 50% by weight of ethylenically unsaturated sulfonic acids, as are described for example in EP-A-0877002. Suitable weak ethylenically unsaturated carboxylic acids are in particular $C_3$-$C_6$-monocarboxylic acids, such as acrylic acid and methacrylic acid. Suitable ethylenically unsaturated sulfonic acids are 2-acetylamidomethyl-1-propanesulfonic acid, 2-methacrylic amido-2-methyl-1-propanesulfonic acid, 2-methacrylamido-2-hydroxypropanesulfonic acid, allylsulfonic acid, methallylsulfonic acid, allyloxy-benzenesulfonic acid, methallyloxybenzenesulfonic acid, 2-hydroxy-3-(2-propenyloxy) propanesulfonic acid, 2-methyl-2-propene-1-sulfonic acid, styrenesulfonic acid, vinylsulfonic acid, 3-sulfopropyl acrylate, 3-sulfopropyl methacrylate, sulfomethylacrylamide, sulfomethylmethacrylamide and salts of these acids. The copolymers can also comprise, in polymerized-in form, 0 to 30% by weight of ethylenically unsaturated $C_4$-$C_8$-dicarboxylic acids, such as maleic acid, as well as 0 to 30% by weight of at least one monomer which is copolymerizable with the aforementioned monomers. The latter is, for example, $C_1$-$C_4$-alkyl esters of (meth)acrylic acid, $C_1$-$C_4$-hydroxyalkyl esters of (meth)acrylic acid, acrylamide, alkyl-substituted acrylamide, N,N-dialkyl-substituted acrylamide, vinylphosphonic acid, vinyl acetate, allyl alcohols, sulfonated allyl alcohols, styrene and other vinylaromatics, acrylonitrile, N-vinylpyrrolidone, N-vinylformamide, N-vinylimidazole or N-vinylpyridine. The weight-average molecular weight of these copolymers is in the range from 3000 to 50 000 Daltons. Copolymers with about 77% by weight of at least one ethylenically unsaturated $C_3$-$C_6$-monocarboxylic acid and about 23% by weight of at least one ethylenically unsaturated sulfonic acid are particularly suitable.

Graft polymers of unsaturated carboxylic acids on low molecular weight carbohydrates or hydrogenated carbohydrates, cf. U.S. Pat. No. 5,227,446, DE-A 4415623 and DE-A 4313909, are likewise suitable. Suitable unsaturated carboxylic acids here are, for example, maleic acid, fumaric acid, itaconic acid, citraconic acid, acrylic acid, methacrylic acid, crotonic acid and vinylacetic acid, and mixtures of acrylic acid and maleic acid, which are grafted on in amounts of from 40 to 95% by weight, based on the component to be grafted. For the modification, additionally up to 30% by weight, based on the component to be grafted, of further monoethylenically unsaturated monomers can be present in polymerized-in form. Suitable modifying monomers are the aforementioned monomers of groups (ii) and (iii). Suitable graft bases are degraded polysaccharides, such as e.g. acidically or enzymatically degraded starches, inulins or cellulose, protein hydrolyzates and reduced (hydrogenated or reductively aminated) degraded polysaccharides, such as e.g. mannitol, sorbitol, aminosorbitol and N-alkylglucamine, and also polyalkylene glycols with molar masses having up to $M_w$=5000 such as e.g. polyethylene glycols, ethylene oxide/propylene oxide or ethylene oxide/butylene oxide or ethylene oxide/propylene oxide/butylene oxide block copolymers and alkoxylated mono- or polyhydric $C_1$-$C_{22}$-alcohols (cf. U.S. Pat. No. 5,756,456).

Likewise of suitability are polyglyoxylic acids, as are described for example in EP-B-001004, U.S. Pat. No. 5,399,286, DE-A-4106355 and EP-A-656914. The end groups of the polyglyoxylic acids can have different structures.

Furthermore, polyamidocarboxylic acids and modified polyamidocarboxylic acids are suitable; these are known for example from EP-A-454126, EP-B-511037, WO-A94/01486 and EP-A-581452.

Polyaspartic acids and their alkali metal salts or cocondensates of aspartic acid with other amino acids, e.g. with glycine, glutamic acid or lysine, $C_4$-$C_{25}$-mono- or -dicarboxylic acids and/or $C_4$-$C_{25}$-mono- or -diamines can also be used as polymeric compounds containing carboxylic acid groups.

Among the polymeric compounds containing carboxylic acid groups, preference is given to polyacrylic acids also in partially or completely neutralized form.

Suitable organic builders are also iminodisuccinic acid, oxydisuccinic acid, amino-polycarboxylates, alkylpolyaminocarboxylates, aminopolyalkylenephosphonates, polyglutamates, hydrophobically modified citric acid, such as e.g. agaricic acid, poly-[alpha]-hydroxyacrylic acid, N-acylethylenediamine triacetates such as lauroylethylenediamine triacetate and alkylamides of ethylenediaminetetraacetic acid such as EDTA tallow amide.

Furthermore, it is also possible to use oxidized starches as organic builders.

Component D)

The bleach systems D) comprise at least one bleaching agent and optionally at least one further component selected from bleach activators, bleach catalysts and bleach stabilizers.

Suitable bleaching agents are, for example, percarboxylic acids, e.g. diperoxo-dodecanedicarboxylic acid, phthalimidopercaproic acid or monoperoxophthalic acid or -terephthalic acid, salts of percarboxylic acids, e.g. sodium percarbonate, adducts of hydrogen peroxide onto inorganic salts, e.g. sodium perborate monohydrate, sodium perborate tetrahydrate, sodium carbonate perhydrate or sodium phosphate perhydrate, adducts of hydrogen peroxide onto organic compounds, e.g. urea perhydrate, or of inorganic peroxo salts, e.g. alkali metal persulfates, or peroxodisulfates.

Suitable bleach activators are, for example, polyacylated sugars, e.g. pentaacetyl-glucose; acyloxybenzenesulfonic acids and their alkali metal and alkaline earth metal salts, e.g. sodium p-nonanoyloxybenzenesulfonate or sodium p-benzoyloxybenzene-sulfonate; -N,N-diacylated and N,N,N',N'-tetraacylated amines, e.g. N,N,N',N'-tetra-acetylmethylenediamine and -ethylenediamine (TAED), N,N-diacetylaniline, N,N-diacetyl-p-toluidine or 1,3-diacylated hydantoins such as 1,3-diacetyl-5,5-dimethyl-hydantoin; N-alkyl-N-sulfonylcarboxamides, e.g. N-methyl-N-mesylacetamide or N-methyl-N-mesylbenzamide; N-acylated cyclic hydrazides, acylated triazoles or urazoles, e.g. monoacetylmaleic acid hydrazide; O,N,N-trisubstituted hydroxylamines, e.g. O-benzoyl-N,N-succinylhydroxylamine, O-acetyl-N,N-succinylhydroxylannine or O,N,N-triacetylhydroxylamine; N,N'-diacylsulfurylamides, e.g. N,N'-dimethyl-N,N'-diacetylsulfurylamide or N,N'-diethyl-N,N'-dipropionylsulfurylamide; acylated lactams such as, for example, acetylcaprolactam, octanoylcaprolactam, benzoylcaprolactam or carbonylbiscaprolactam; anthranil derivatives such as e.g. 2-methylanthranil or 2-phenylanthranil; triacylcyanurates, e.g. triacetyl cyanurate or tribenzoyl cyanurate; oxime esters and bisoxime esters, such as e.g. 0-acetylacetone oxime or bisisopropyl-iminocarbonate; carboxylic acid anhydrides, e.g. acetic anhydride, benzoic anhydride, m-chlorobenzoic anhydride or phthalic anhydride; enol esters, such as e.g. isopropenyl acetate; 1,3-diacyl-4,5-diacyloxyimidazolines, e.g. 1,3-diacetyl-4,5-diacetoxy-imidazoline; tetraacetylglycoluril and tetrapropionylglycoluril; diacylated 2,5-diketopiperazines, e.g. 1,4-diacetyl-2,5-diketopiperazine; ammonium-substituted nitriles, such as e.g. N-methylmorpholinium acetonitrile methylsulfate; acylation products of propylenediurea and 2,2-dimethylpropylenediurea, e.g. tetraacetyl-propylenediurea; α-acyloxypolyacylmalonamides, e.g. α-acetoxy-N,N'-diacetylmalon-amide; diacyldioxohexahydro-1,3,5-triazines, e.g. 1,5-diacetyl-2,4-dioxohexahydro-1,3,5-triazine; benz-(4H)-1,3-oxazin-4-ones with alkyl radicals, e.g. methyl, or aromatic radicals, e.g. phenyl, in the 2 position.

A bleach system of bleaching agents and bleach activators can optionally also comprise bleach catalysts. Suitable bleach catalysts are, for example, quaternized imines and sulfonimines, which are described for example in U.S. Pat. No. 5,360,569 and EP-A 453 003. Particularly effective bleach catalysts are manganese complexes, which are described for example in WO-A 94/21777. Such compounds are incorporated in the case of their use in detergents and cleaners at most in amounts up to 1.5% by weight, in particular up to 0.5% by weight, in the case of very active manganese complexes in amounts up to 0.1% by weight. Besides the described bleach system of bleaching agents, bleach activators and optionally bleach catalysts, the use of systems with enzymatic peroxide release or of photoactivated bleach systems is also possible for the detergents and cleaners according to the invention.

Component E)

Suitable enzymes (=component E1) are those as are customarily used as industrial enzymes. These include both enzymes with optimum activity in the neutral to alkaline pH range as well as enzymes with optimum activity in the acidic pH range.

The enzymes are preferably selected from aminopeptidases, amylases, arabinases, carbohydrases, carboxypeptidases, catalases, cellulases, chitinases, cutinases, cyclodextringlycosyltransferases, deoxyribonucleases, esterases, galactanases, alpha-galactosidases, beta-galactosidases, glucanases, glucoamylases, alpha-glucosidases, beta-glucosidases, haloperoxidases, hydrolaseinvertases, isomerases, keratinases, laccases, lipases, mannanases, mannosidases, oxidases, pectinolytic enzymes, peptidoglutaminases, peroxidases, peroxygenases, phytases, polyphenoloxidases, proteolytic enzymes, ribonucleases, transglutaminases, transferases, xylanases and mixtures thereof.

The enzymes are specifically selected from hydrolases, such as proteases, esterases, glucosidases, lipases, amylases, cellulases, mannanases, other glycosylhydrolases and mixtures of the aforementioned enzymes. All of these hydrolases contribute to the soil dissolving and removal of protein-, grease- or starch-containing soilings. Oxireductases can also be used for bleaching. Of particularly good suitability are enzymatic active ingredients obtained from bacterial strains or fungi such as *Bacillus subtilis, Bacillus licheniformis, Streptomyceus griseus* and *Humicola insolens*.

Preferred enzymes are described in more detail below:

Proteases:

Suitable proteolytic enzymes (proteases) can in principle be of animal, vegetable or microbial origin. Preference is given to proteolytic enzymes of microbial origin. These also include chemically or genetically modified mutants.

Lipases:

Suitable lipases can in principle originate from bacteria or fungi. These also include chemically or genetically modified mutants.

Amylases:

In principle, all α- and/or β-amylases are suitable. Suitable amylases can in principle originate from bacteria or fungi. These also include chemically or genetically modified mutants.

Cellulases:

In principle, all cellulases are suitable. Suitable cellulases can in principle originate from bacteria or fungi. These also include chemically or genetically modified mutants.

Peroxidases/Oxidases:

Suitable peroxidases/oxidases can in principle originate from plants, bacteria or fungi. These also include chemically or genetically modified mutants.

Lyases:

In principle, all lyases are suitable. Suitable lyases can in principle originate from bacteria or fungi. These also include chemically or genetically modified mutants.

Compositions according to the invention can comprise further enzymes, which are summarized under the term hemicellulases. These include, for example, mannanases, xanthan lyases, pectin lyases (=pectinases), pectinesterases, xyloglucanases (=xylanases), pullulanases and β-glucanases.

Preferably, the detergent or cleaner according to the invention comprises at least one enzyme which is selected from proteases, amylases, mannanases, cellulases, lipases, pectin lyases and mixtures thereof.

Preferably, the detergent or cleaner according to the invention comprises at least one protease and/or amylase.

Preferably, the detergent, cleaner and dishwashing detergent according to the invention comprises an enzyme mixture. For example, preference is given to enzyme mixtures which comprise or consist of the following enzymes:
protease and amylase,
protease and lipase (or lipolytically acting enzymes),
protease and cellulase,
amylase, cellulase and lipase (or lipolytically acting enzymes),
protease, amylase and lipase (or lipolytically acting enzymes),
protease, lipase (or lipolytically acting enzymes) and cellulase.

The enzymes can be adsorbed onto carrier substances in order to protect them from premature decomposition.

The detergent or cleaner according to the invention can optionally also comprise enzyme stabilizers. These include e.g. calcium propionate, sodium formate, boric acids, boronic acids and salts thereof, such as 4-formylphenylboronic acid, peptides and peptide derivatives, such as e.g. peptide aldehydes, polyols, such as 1,2-propanediol, and mixtures thereof.

The detergents or cleaners according to the invention comprise the enzymes preferably in an amount of from 0.1 to 5% by weight, particularly preferably 0.12 to 2.5% by weight, based on the total weight of the detergents or cleaners.

In order to impart the desired viscosity to liquid and specifically aqueous compositions, at least one thickener (=component E2) can additionally be used as component E).

Of suitability in principle are any known thickeners (rheology modifiers) provided they do not have a negative influence on the effect of the detergent and cleaner. Suitable thickeners may either be of natural origin or synthetic in nature.

Examples of thickeners of natural origin are xanthan, carob seed flour, guar flour, carrageenan, agar, tragacanth, gum Arabic, alginates, modified starches, such as hydroxyethyl starch, starch phosphate esters or starch acetates, dextrins, pectins and cellulose derivatives, such as carboxymethylcellulose, hydroxyethylcellulose, hydroxypropylcellulose, hydroxypropylmethylcellulose, methylcellulose and the like.

Thickeners of natural origin are also inorganic thickeners, such as polysilicic acids and clay minerals, e.g. sheet silicates, like also the silicates specified under the builders.

Examples of synthetic thickeners are polyacrylic and polymethacrylic compounds, such as (partially) crosslinked homopolymers of acrylic acid, for example with an allyl ether of sucrose or pentaerythritol or propylene-crosslinked homopolymers of acrylic acid (carbomer), e.g. the Carbopol® grades from BF Goodridge (e.g. Carbopol® 676, 940, 941, 934 or the like) or the Polygel® grades from 3V Sigma (e.g. Polygel® DA), copolymers of ethylenically unsaturated mono- or dicarboxylic acids, for example terpolymers of acrylic acid, methacrylic acid or maleic acid with methyl or ethyl acrylate and a (meth)acrylate derived from long-chain ethoxylated alcohols, for example the Acusol® grades from Rohm & Haas (e.g. Acusol® 820 or 1206A), copolymers of two or more monomers which are selected from acrylic acid, methacrylic acid and their $C_1$-$C_4$-alkyl esters, e.g. copolymers of methacrylic acid, butyl acrylate and methyl methacrylate or of butyl acrylate and methyl methacrylate, e.g. the Aculyn® and Acusol® grades from Rohm & Haas (e.g. Aculyn® 22, 28 or 33 and Acusol® 810, 823 and 830), or crosslinked high molecular weight acrylic acid copolymers, for example with an allyl ether of sucrose or pentaerythritol-crosslinked copolymers of $C_{10}$-$C_{30}$-alkyl acrylates with one or more comonomers which are selected from acrylic acid, methacrylic acid and their $C_1$-$C_4$-alkyl esters (e.g. Carbopol® ETD 2623, Carbopol® 1382 or Carbopol® AQUA 30 from Rohm & Haas).

Examples of synthetic thickeners are also reaction products of maleic acid polymers with ethoxylated long-chain alcohols, e.g. the Surfonic L series from Texaco Chemical Co. or Gantrez AN-119 from ISP; polyethylene glycols, polyamides, polyimines and polycarboxylic acids.

Also of suitability are mixtures of the aforementioned thickeners.

Preferred thickeners are xanthans and the aforementioned polyacrylic and polymethacrylic compounds.

Suitable organic solvents (=component E3) are selected from mono- or polyhydric alcohols, alkanolamines or glycol ethers. Preferably, they are selected from ethanol, n- or isopropanol, butanols, glycol, propane- or butanediol, glycerol, diglycol, propyl or butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl, ethyl or propyl ether, dipropylene glycol monomethyl or -ethyl ether, diisopropylene glycol monomethyl or -ethyl ether, methoxy, ethoxy or butoxy triglycol, isobutoxyethoxy-2-propanol, 3-methyl-3-methoxybutanol, propylene glycol t-butyl ether, and mixtures of these solvents.

Suitable foam inhibitors or antifoams (=component E4) are the compounds mentioned above. For example, soaps, paraffins or silicone oils, which can optionally be applied to carrier materials, are suitable.

Suitable bases (=component E5) are alkali metal hydroxides, alkaline earth metal hydroxides, alkali metal carbonates, alkaline earth metal carbonates, ammonium carbonate, alkali metal hydrogencarbonates, alkaline earth metal hydrogencarbonates, ammonium hydrogencarbonates and mixtures thereof. Preference is given to using Na, Li and Mg carbonates and hydrogencarbonates, in particular sodium carbonate and/or odium hydrogencarbonate.

Additionally, the detergents, cleaners or dishwashing detergents according to the invention can comprise further additives E6), which further improve the application and/or esthetic properties. As a rule, preferred compositions comprise, in addition to the aforementioned components, at least one further additive which is selected from electrolytes, pH adjusting agents, perfume carriers, fluorescent agents, hydrotropes, antiredeposition agents, optical brighteners, graying inhibitors, detergent boosters, shrink preventers, anticrease agents, color transfer inhibitors, antimicrobial active ingredients, antioxidants, corrosion inhibitors, antistats, ironing aids, phobicization and impregnation agents, swelling and slip-resist agents, and UV absorbers.

Suitable color transfer inhibitors are especially homopolymers or copolymers comprising at least one monomer, in copolymerized form, selected from N-vinylpyrrolidone, N-vinylcaprolactam, N-vinylimidazole, 2-vinylpyridine, 4-vinylpyridine, salts of the latter three monomers mentioned, 4-vinylpyridine N-oxide, N-carboxymethyl-4-vinylpyridinium halides and mixtures thereof.

Suitable greying inhibitors and/or detergent boosters are especially:

carboxymethylcellulose,
graft polymers of vinyl acetate onto carbohydrates, for example on degraded starch,
graft polymers of vinyl acetate onto polyethylene glycol,
alkoxylated oligo- and polyamines, for example ethoxylated hexamethylenediamine, which may in addition be present in quaternized and/or sulfated form, or alkoxylated polyethylenimine having 16 to 24 EO per NH,
copolymers based on styrene and maleic acid, which may in addition be modified with end group-capped polyethylene glycol,
copolymers based on styrene and acrylic acid.

In order to improve the esthetic impression of the detergents, cleaners or dishwashing detergents according to the invention, they can be colored using suitable dyes. Preferred dyes, the selection of which does not present the person skilled in the art with any difficulty, have high storage stability and insensitivity to the other ingredients of the compositions and towards light, as well as no more substantivity towards textile fibers so as not to stain these.

I & I Cleaners

The washing- and cleaning-active polymer films according to the invention are also suitable for industrial and institutional cleaners (I & I cleaners). (Industrial and institutional cleaners are typically detergents, all-purpose cleaners, foam cleaners, CIP cleaners (cleaning in place cleaners) for professional and generally automated cleaning operations, e.g. in industrial laundries, dairies, breweries, the food and drink industry, the pharmaceutical industry or pharmaceutical technology, or sanitary cleaners.

The cleaners can be strongly basic with a high electrolyte content and, if required, comprise bleaching agents (such as hydrogen peroxide, sodium hypochlorite) or disinfectants and antifoams (e.g. in bottle cleaning). It is also possible for the customary aforementioned enzymes to be present in the industrial and institutional cleaners. As regards the types of cleaning for which the formulations according to the invention are suitable, there is great variety. By way of example, mention may be made of cleaning baths (stationary or mobile), spray cleaning, ultrasound cleaning, steam jet cleaning and high-pressure cleaning, optionally in combination with mechanical cleaning, e.g. by rotating brushes.

The specified formulations for cleaning include those for industry, transport, commerce and industry and for the private sector. Specific examples include: professional laundries, professional cleaning businesses, ore processing industry, metal and metalworking industry, automobile and automobile supply industry, electrical industry, electronics industry, photographic industry and businesses, leisure industry and businesses, construction material industry, brewing industry and businesses; food industry (e.g. processing or production of meat, poultry, dairy and fish products), animal nutrition industry, cosmetics industry, pharmaceutical industry, agrochemical industry, gastronomy, the health sector, workshops, and public transport. Examples of objects to be cleaned are institutional laundry, hospital laundry, laundry from laundry collections, buildings with living spaces, office spaces or commercial spaces of a very wide variety of different kinds, and sanitary spaces, warehouses, breweries, small businesses such as bakeries, butcheries and supermarkets; hospitals, care homes, homes for the elderly, administration buildings, factory buildings, doctor's practices; and also motor vehicles (cars and trucks), buses, road tanker vehicles (interior and exterior), rail tanker wagons, passenger vehicles and goods vehicles, and aircraft and ships; also building facades, tiled or painted walls, floors made of wood (parquet, boards) with screed or textile or plastic coverings, signaling and lighting installations, furniture, railings, overhead signage, other signage, safety reflectors, delineating markers, tanks, dishes, glass panes, roads and paths, outside paving, road and railway tunnels.

The invention is illustrated in more detail by reference to the figures and examples described below. Here, the figures and examples should not be construed as being delimiting for the invention.

EXAMPLES

All of the examples of the following various synthesis variants were performed using the same general preparation procedure.

General Preparation Procedure:

The initial charge was heated to 75° C. with stirring at 100 rpm. Then, feeds 1, 2 and 3 were metered in over 4 h and the reaction mixture was after-polymerized for a further hour. The mixture was then allowed to cool to room temperature. The polymer composition is produced in the form of a transparent and viscous solution.

The weight-average molecular weight $M_w$ of the polymer composition according to the invention was determined by means of gel permeation chromatography (GPC) in aqueous solution using neutralized polyacrylic acid as polymer standard. In this type of molecular weight determination, the components of the polymer composition are ascertained which comprise the aforementioned monomers M) in polymerized-in form.

Standard: neutralized polyacrylic acid. The calibration was carried out with narrowly distributed Na-PAA standards from PSS (Polymer Standards Service GmbH) with molecular weights of M=1250 to M=1 100 000 g/mol. Additionally, PAA standards from the American Polymer Standards Corporation with molecular weight M=1770, and M=900 g/mol were used. The values outside of this elution range were extrapolated.

Eluent: 0.01 mol/l phosphate buffer pH=7.4 in distilled water with 0.01 M $NaN_3$ Flow rate: 0.8 ml/min Injection amount: 100 µl Concentration: 1.5 mg/ml The sample solutions were filtered over Millipore IC Millex-LG filter (0.2 µm).

Column name: TSKgel GMPWXL

Column attachment: 2 separation columns (length=each 30 cm), exclusion limit 1000-8 000 000 g/mol Detector: DRI Agilent 1200 UV Agilent 1200 VWD [260 nm]

Synthesis Variant A)

The synthesis variant A) (see Table a)) was used for the preparation of the polymer compositions of films 1, 6, 7, 8, 9, 10, 11 and of comparison films I and II, which are described in Table 1.

Preparation of a polymer composition with a molecular weight as given in Table 1 of acrylic acid and a ($C_8$-$C_{18}$-alkyl)polyoxyalkylene ether with 3 to 12 alkylene oxide units per molecule in a weight ratio of 2:1.

TABLE a

| | Feed material | Amount (% by weight) | Content (%) |
|---|---|---|---|
| Initial charge | ($C_8$-$C_{18}$-Alkyl)polyoxy-alkylene ether | 24.00 | 100.00 |
| | Water[a] | 18.00 | 100.00 |
| Feed 1 | Acrylic acid | 48.00 | 100.00 |
| Feed 2 | Initiator[b] | 0.34 | 100.00 |
| | Water[a] | 3.83 | 100.00 |
| Feed 3 | 2-Mercaptoethanol | 0.96 | 100.00 |
| | Sodium hypophosphite | 2.62 | 55.00 |
| | Water[a] | 2.25 | 100.00 |

[a] completely demineralized water
[b] 2,2'-azobis(2-methylpropionamidine) dihydrochloride (CAS No. 2997-92-4)

Synthesis Variant B)

Preparation of a polymer composition with a molecular weight as given in Table 1 of acrylic acid and a $C_{13}C_{15}$-oxo alcohol with 7 EO in a weight ratio of 2:1.

Example B-1

The synthesis variant B-1) (see Table b1)) was used for the preparation of the polymer composition of film 2, as described in Table 1.

TABLE b1

| | Feed material | Amount (% by weight) | Content (%) |
|---|---|---|---|
| Initial charge | $C_{13}C_{15}$-Oxo alcohol with 7 EO | 24.43 | 100.00 |
| | Water[a] | 18.24 | 100.00 |
| Feed 1 | Acrylic acid | 48.85 | 100.00 |
| Feed 2 | Initiator[b] | 0.35 | 100.00 |
| | Water[a] | 3.89 | 100.00 |
| Feed 3 | 2-Mercaptoethanol | 0.49 | 100.00 |
| | Water[a] | 3.75 | 100.00 |

[a] completely demineralized water
[b] 2,2'-azobis(2-methylpropionamidine) dihydrochloride (CAS No. 2997-92-4)

Example B-2

The synthesis variant B-2) (see Table b2)) was used for the preparation of the polymer composition of film 3, as described in Table 1.

TABLE b2

| Feed material | | Amount (% by weight) | Content (%) |
|---|---|---|---|
| Initial charge | $C_{13}C_{15}$-Oxo alcohol with 7 EO | 24.72 | 100.00 |
| | Water[a] | 17.25 | 100.00 |
| Feed 1 | Acrylic acid | 49.44 | 100.00 |
| Feed 2 | Initiator[b] | 0.35 | 100.00 |
| | Water[a] | 3.94 | 100.00 |
| Feed 3 | 2-Mercaptoethanol | 0.10 | 100.00 |
| | Water[a] | 4.20 | 100.00 |

[a] completely demineralized water
[b] 2,2'-azobis(2-methylpropionamidine) dihydrochloride (CAS No. 2997-92-4)

Synthesis Variant C)

Preparation of a polymer composition with a molecular weight as given in Table 1 of acrylic acid and a $C_{13}C_{15}$-oxo alcohol with 7 EO in a weight ratio as likewise given in Table 1.

Example C-1

The synthesis variant C-1) (see Table c1)) was used for the preparation of the polymer composition of film 4, as described in Table 1.

TABLE c1

| Feed material | | Amount (% by weight) | Content (%) |
|---|---|---|---|
| Initial charge | $C_{13}C_{15}$-Oxo alcohol with 7 EO | 36.36 | 100.00 |
| | Water[a] | 18.18 | 100.00 |
| Feed 1 | Acrylic acid | 36.36 | 100.00 |
| Feed 2 | Initiator[b] | 0.26 | 100.00 |
| | Water[a] | 4.29 | 100.00 |
| | 2-Mercaptoethanol | 0.73 | 100.00 |
| Feed 3 | Sodium hypophosphite | 1.98 | 55.00 |
| | Water[a] | 1.84 | 100.00 |

[a] completely demineralized water
[b] 2,2'-azobis(2-methylpropionamidine) dihydrochloride (CAS No. 2997-92-4)

Example C-2

The synthesis variant (C-2) (see Table c2)) was used for the preparation of the polymer composition of film 5, as described in Table 1.

TABLE c2

| Feed material | | Amount (% by weight) | Content (%) |
|---|---|---|---|
| Initial charge | $C_{13}C_{15}$-Oxo alcohol with 7 EO | 17.91 | 100.00 |
| | Water[a] | 17.06 | 100.00 |
| Feed 1 | Acrylic acid | 53.72 | 100.00 |
| Feed 2 | Initiator[b] | 0.38 | 100.00 |
| | Water[a] | 4.33 | 100.00 |
| Feed 3 | 2-Mercaptoethanol | 1.07 | 100.00 |
| | Sodium hypophosphite | 2.93 | 55.00 |
| | Water[a] | 2.60 | 100.00 |

[a] completely demineralized water
[b] 2,2'-azobis(2-methylpropionamidine) dihydrochloride (CAS No. 2997-92-4)

Synthesis Variant D)

Preparation of a polymer composition with a molecular weight as given in Table 2 of acrylic acid, a comonomer and a $C_{13}C_{15}$-oxo alcohol with 7 EO in a weight ratio of monomers to oxo alcohol ethoxylate of 2:1.

Example D-1 (Polymer Composition Based on Acrylic Acid and Itaconic Acid)

The synthesis variant D-1) (see Table d1)) was used for the preparation of the polymer composition 1 in Table 2.

TABLE d1

| Feed material | | Amount (% by weight) | Content (%) |
|---|---|---|---|
| Initial charge | $C_{13}C_{15}$-Oxo alcohol with 7 EO | 24.00 | 100.00 |
| | Water[a] | 18.00 | 100.00 |
| | Itaconic acid | 20.94 | 100.00 |
| Feed 1 | Acrylic acid | 27.06 | 100.00 |
| Feed 2 | Initiator[b] | 0.34 | 100.00 |
| | Water[a] | 3.83 | 100.00 |
| Feed 3 | 2-Mercaptoethanol | 0.96 | 100.00 |
| | Sodium hypophosphite | 2.62 | 55.00 |
| | Water[a] | 2.25 | 100.00 |

[a] completely demineralized water
[b] 2,2'-azobis(2-methylpropionamidine) dihydrochloride (CAS No. 2997-92-4)

Example D-2 (Polymer Composition Based on Acrylic Acid and Methacrylic Acid)

The synthesis variant D-2 was used for the preparation of the polymer composition 2 in Table 2.

TABLE d2

| Feed material | | Amount (% by weight) | Content (%) |
|---|---|---|---|
| Initial charge | $C_{13}C_{15}$-Oxo alcohol with 7 EO | 24.00 | 100.00 |
| | Water[a] | 18.00 | 100.00 |
| Feed 1 | Methacrylic acid | 26.13 | 100.00 |
| | Acrylic acid | 21.87 | 100.00 |
| Feed 2 | Initiator[b] | 0.34 | 100.00 |
| | Water[a] | 3.83 | 100.00 |
| | 2-Mercaptoethanol | 0.96 | 100.00 |
| Feed 3 | Sodium hypophosphite | 2.62 | 55.00 |
| | Water[a] | 2.25 | 100.00 |

[a] completely demineralized water
[b] 2,2'-azobis(2-methylpropionamidine) dihydrochloride (CAS No. 2997-92-4)

Example D-3 (Polymer Composition Based on Acrylic Acid and the Sodium Salt of 2-Acrylamido-2-Methylpropanesulfonic Acid)

The synthesis variant D-3 was used for the preparation of the polymer composition 3 of Table 2.

TABLE d3

| | Feed material | Amount (% by weight) | Content (%) |
|---|---|---|---|
| Initial charge | $C_{13}C_{15}$-Oxo alcohol with 7 EO | 24.07 | 100.00 |
| | Water[a] | 10.86 | 100.00 |
| Feed 1 | 2-Acrylamido-2-methylpropane-sulfonic acid, Na salt | 13.81 | 50.00 |
| | Acrylic acid | 41.25 | 100.00 |
| Feed 2 | Initiator[b] | 0.34 | 100.00 |
| | Water[a] | 3.83 | 100.00 |
| Feed 3 | 2-Mercaptoethanol | 0.96 | 100.00 |
| | Sodium hypophosphite | 2.63 | 55.00 |
| | Water[a] | 2.25 | 100.00 |

[a] completely demineralized water
[b] 2,2'-azobis(2-methylpropionamidine) dihydrochloride (CAS No. 2997-92-4)

General Description of the Film Production

The viscous polymer composition prepared by polymerization in the presence of surfactant was heated to 70 to 80° C. in order to convert it to a pourable form. The thus heated polymer composition was applied to a glass plate coated with silicone paper using a doctor knife, and immediately cooled to room temperature. The doctor knife used had a tooth height of 600 μm. The film was then dried for 24 hours at room temperature. As a result of the drying, the film thickness reduced to approx. 300 μm. After the drying, the films comprise 5 to 8% water.

TABLE 1

Film compositions

| Film | Synthesis variant | Monomer/ ($C_8$-$C_{18}$-alkyl)poly-oxyalkylene ether | Weight ratio | Mw polymer composition [g/mol] |
|---|---|---|---|---|
| 1 | A | Acrylic acid/ $C_{13}C_{15}$-oxo alcohol with 7 EO | 2:1 | 5330 |
| 2 | B | Acrylic acid/ $C_{13}C_{15}$-oxo alcohol with 7 EO | 2:1 | 20 600 |
| 3 | B | Acrylic acid/ $C_{13}C_{15}$-oxo alcohol with 7 EO | 2:1 | 62 300 |
| 4 | C | Acrylic acid/ $C_{13}C_{15}$-oxo alcohol with 7 EO | 1:1 | 5130 |
| 5 | C | Acrylic acid/ $C_{13}C_{15}$-oxo alcohol with 7 EO | 3:1 | 5590 |
| 6 | A | Acrylic acid/ $C_{13}C_{15}$-oxo alcohol with 5 EO | 2:1 | 6270 |
| 7 | A | Acrylic acid/ $C_{13}C_{15}$-oxo alcohol with 8 EO | 2:1 | 5470 |
| 8 | A | Acrylic acid/ $C_{13}$-oxo alcohol with 7 EO | 2:1 | 5010 |
| 9 | A | Acrylic acid/ $C_{13}$-oxo alcohol with 8 EO | 2:1 | 5310 |
| 10 | A | Acrylic acid/ $C_{12}C_{18}$-fatty alcohol with 7 EO | 2:1 | 5490 |
| 11 | A | Acrylic acid/ $C_{10}$-Guerbet alcohol with 7 EO | 2:1 | 5480 |
| Comparison film I[a] | A | Acrylic acid/ $C_{13}$-oxo alcohol with 20 EO | 2:1 | 5130 |
| Comparison film II[b] | A | Acrylic acid/bilaterally alkyl-terminated PEO | 2:1 | 5050 |
| Comparison film III[c] | — | — | — | — |

[a] higher degree of ethoxylation than polymer film according to the invention
[b] bilaterally alkyl-terminated PEO = bilaterally terminally $C_xH_{2x+1}$/$C_yH_{2y+1}$ – terminated polyethylene oxide with a free OH group and x, y = 6 to 14
[c] polyvinyl alcohol film - M8630 - Monosol The films comprise 5 to 8% water.

TABLE 2

Film compositions

| Example | Synthesis variant | Monomer/ ($C_8$-$C_{18}$-alkyl)poly-oxyalkylene ether | Weight ratio | Mw polymer composition [g/mol] |
|---|---|---|---|---|
| D1 | D | Acrylic acid, itaconic acid/$C_{13}C_{15}$-oxo alcohol with 7 EO | 2:1 | 6580 |
| D2 | D | Acrylic acid, methacrylic acid/$C_{13}C_{15}$-oxo alcohol with 7 EO | 2:1 | 7890 |
| D3 | D | Acrylic acid, 2-acrylamido-2-methylpropanesulfonic acid Na salt/$C_{13}C_{15}$-oxo alcohol with 7 EO | 2:1 | 4810 |

The polymer composition according to the invention can be formulated with at least one plasticizer. For example, the polymer composition prepared by the above-described synthesis variant A) for film 1 according to Table 1 can be mixed with 3% by weight of triethylene glycol, based on the total weight of the resulting polymer composition. Following the liquid application to a substrate and the drying, a transparent film is obtained which is so flexible that the two ends can touch without the film breaking. Without the use of triethylene glycol, a stiffer film is obtained which breaks if the two ends are brought into contact.

Furthermore, the polymer composition prepared by the above-described synthesis variant B) for film 2 according to Table 1 can be mixed with 8% by weight of glycerol, based on the total weight of the resulting polymer composition. Following the liquid application to a substrate and the drying, a transparent film is obtained which is so flexible that the two ends can touch without the film breaking. Without the use of glycerol, a stiffer film is obtained which breaks if the two ends are brought into contact.

Application Examples

The washing effect of the films according to the invention was determined as follows:
Selected soiled fabrics were washed in the presence of ballast fabric made from cotton at 40° C. with the addition of the films according to the invention. After the wash cycle, the fabrics were rinsed, spun and dried.

To determine the washing effect, the reflectance of the soiled fabric was measured before and after the washing using a photometer from Datacolor (Elrepho 2000) at 460 nm. The higher the reflectance value, the better the washing ability.

Washing Conditions:

| Appliance | Launder-o-meter, LP2 model, SDL Atlas Inc., USA |
|---|---|
| Wash liquor | 250 ml |
| Wash time/wash temperature | 30 min at 40° C. |
| Dosage | 1.5 g film (initial weight refers to the solids content of the film, ascertained after drying for 2 h in a circulating-air cabinet at 120° C.) |
| Liquor ratio | 1:12.5 |
| Wash cycles | 1 |
| Water hardness | 2.5 mmol/l $Ca^{2+}$:$Mg^{2+}$:$HCO_3^-$ 4:1:8 |
| Ballast fabric | 10 g cotton fabric 283 |
| Sum of ballast fabric + soiled fabric | 20 g |
| Soiled fabric | 10 g wfk 20 D [1)] |
| | 10 g wfk 10 PF [2)] |
| | 10 g EMPA 123 [3)] |
| | 10 g EMPA 125 [4)] |
| | 10 g olive oil on mixed fabric [5)] |

[1)] wfk 20 D polyester/cotton fabric, pigment/sebum soiling, reflectance 33.9%
[2)] wfk 10 PF cotton fabric, pigment/vegetable fat soiling, reflectance 33.8%
[3)] EMPA 123 cotton fabric, soiling for low-temperature wash, reflectance 21.0%
[4)] EMPA 125 cotton fabric for surfactant tests, reflectance 21.0%
[5)] olive oil on cotton/polyester mixted fabric
[1)2)] Manufacturer/supplier: wfk Testgewebe GmbH, Brüggen, Germany
[3)4)] Manufacturer/supplier: EMPA Testmaterialien AG, Saint Gallen, Switzerland
[5)] Inhouse soiling BASF SE, Ludwigshafen, Germany
Preparation: 0.1 g of olive oil mixed with 0.1% Sudan red is applied using a pipette to the middle of a mixed fabric made of polyester/cotton and weighing 5 g. The soiled fabric is stored overnight before it is washed.

Wash Result (Evaluation % Reflectance)

| Film | wfk 20 D | wfk 10 PF | EMPA 123 | EMPA 125 | Olive oil on MF | Total |
|---|---|---|---|---|---|---|
| Without | 37.7 | 33.8 | 29.8 | 25.5 | 33.9 | 160.7 |
| 1 | 59.5 | 47.9 | 42.4 | 50.7 | 54.3 | 254.8 |
| 2 | 59.9 | 47.0 | 43.6 | 50.7 | 55.8 | 257.1 |
| 3 | 60.8 | 50.1 | 42.5 | 48.6 | 54.9 | 256.9 |
| 4 | 61.4 | 48.0 | 41.2 | 47.4 | 57.9 | 255.8 |
| 5 | 55.9 | 44.7 | 41.1 | 49.7 | 53.5 | 244.8 |
| 6 | 55.1 | 51.3 | 42.7 | 52.1 | 57.0 | 258.2 |
| 7 | 59.7 | 47.8 | 43.8 | 47.4 | 55.4 | 254.1 |
| 8 | 59.0 | 49.1 | 41.4 | 49.6 | 56.0 | 255.1 |
| 9 | 54.7 | 43.4 | 43.3 | 44.1 | 52.9 | 238.5 |
| 10 | 57.7 | 47.5 | 42.4 | 47.3 | 56.0 | 251.0 |
| 11 | 52.2 | 44.2 | 42.0 | 45.6 | 55.3 | 239.2 |
| I | 47.8 | 40.3 | 43.2 | 43.0 | 53.2 | 227.4 |
| II | 50.3 | 38.5 | 41.1 | 46.2 | 53.5 | 229.6 |
| III | 37.1 | 34.9 | 30.5 | 24.4 | 33.2 | 160.1 |

Example 2

The color-transfer-inhibiting effect of the film according to the invention was determined as follows:

Selected colored fabric (EMPA 133) was washed in the presence of white test fabric and ballast fabric made from polyester with the addition of the film at 40° C. The wash liquor was adjusted to pH 8. After the wash cycle, the fabric was rinsed, spun and dried. In order to determine the color-transfer-inhibiting effect, the staining of the white test fabric was ascertained photometrically. The reflectance was determined using a photometer from Datacolor (Elrepho 2000) at 600 nm.

Washing Conditions:

| Appliance | Launder-o-meter, LP2 model, SDL Atlas Inc., USA |
|---|---|
| Wash liquor | 250 ml |
| Wash time/wash temperature | 20 min at 40° C. |
| Dosage | 1.5 g film (initial weight refers to the solids content of the film, ascertained after drying for 2 h in a circulating-air cabinet at 120° C.) |
| Liquor ratio | 1:12.5 |
| Wash cycles | 1 |
| Water hardness | 2.5 mmol/l $Ca^{2+}$:$Mg^{2+}$:$HCO_3^-$ 4:1:8 |
| Ballast fabric | 5 g polyester fabric wfk 30 A |
| Colored fabric | 1 g EMPA 133 [3)] |
| Test fabric | 10 g wfk 10 A [1)] |
| | 5 g wfk 20 A [2)] |

The film used was film 1 which, as a result of additivation during its preparation, comprised 0.2% by weight of a polymeric color transfer inhibitor (CTI):
CTI film 1a: homopolyvinylpyrrolidone with Mw of 40 000 g/mol
CTI film 1b: copolymer of 50% by weight 1-vinylpyrrolidone and 50% by weight 1-vinylimidazole with Mw of 70 000 g/mol
[1)] wfk 10 A cotton fabric, reflectance 82.5
[2)] wfk 20 A polyester-cotton fabric, reflectance 83.6%
[3)] EMPA 133 cotton fabric dyed with direct blue 71
[1)2)] Manufacturer/supplier: wfk Testgewebe GmbH, Brüggen, Germany
[3)] Manufacturer/supplier: EMPA Testmaterialien AG, Saint Gallen, Switzerland Wash Result (Evaluation % Reflectance)

| Film | wfk 10 A | wfk 20 A |
|---|---|---|
| Without | 62.0 | 64.3 |
| 1a | 75.2 | 78.6 |
| 1b | 80.9 | 81.5 |

The invention claimed is:

1. A washing- and cleaning-active polymer film, comprising a polymer composition obtainable by free-radical polymerization of a monomer composition which comprises at least one monomer comprising acrylic acid and/or acrylic acid salts, in the presence of at least one ($C_8$-$C_{18}$-alkyl) polyoxyalkylene ether having on average 5 to 9 ethylene oxide units per molecule, wherein the monomer composition and the at least one ($C_8$-$C_{18}$-alkyl)polyoxyalkylene ether are in a weight ratio from 0.7:1 to 3:1 and the polymer composition has a weight-average molecular weight of from 3000 to 80,000 g/mol.

2. The polymer film according to claim 1, where the monomer composition comprises, in addition to the at least one monomer, at least one monomer which is selected from unsaturated sulfonic acids, salts of unsaturated sulfonic acids, unsaturated phosphonic acids, salts of unsaturated phosphonic acids and mixtures thereof.

3. The polymer film according to claim 1, where the monomer composition additionally comprises at least one comonomer selected from C1) nitrogen heterocycles with a free-radically polymerizable α,β-ethylenically unsaturated double bond, C2) monomers containing amide groups, C3) compounds of the general formulae (I.a) and (I.b)

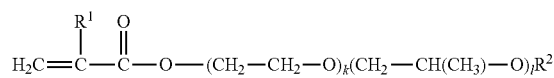

(I.a)

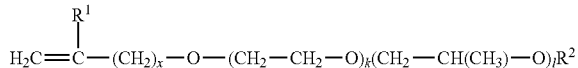

(I.b)

in which
the order of the alkylene oxide units is arbitrary,
x is 0, 1 or 2,
k and l, independently of one another, are an integer from 0 to 100, where the sum of k and l is at least 2,
R1 is hydrogen or methyl,
R2 is hydrogen or C1-C4-alkyl,
and mixtures of two or more than two of the aforementioned monomers C1) to C3).

4. The polymer film according to claim 1, where the monomer composition comprises, based on a total weight, less than 0.1% by weight crosslinking monomers which have two or more than two free-radically polymerizable α,β-ethylenically unsaturated double bonds per molecule.

5. The polymer film according to claim 1, where the monomer composition consists of at least 50% by weight based on a total weight of the monomer composition, of acrylic acid and/or acrylic acid salts.

6. The polymer film according to claim 1, where the free-radical polymerization takes place in the presence of at least one ($C_8$-$C_{18}$-alkyl)polyoxyalkylene ether which comprises exclusively ethylene oxide units incorporated as alkylene oxide units.

7. The polymer film according to claim 1, where the free-radical polymerization takes place in the presence of a solvent which is selected from water, $C_1$-$C_6$-alkanols, polyetherpolyols, their mono- and dialkyl ethers and mixtures thereof.

8. The polymer film according to claim 1, which comprises at least one additive, selected from plasticizers, scavengers, further polymers, agents for modifying the gas permeability and water vapor permeability, antistatic agents, lubricants, slip agents, dissolution auxiliaries, dyes, pigments, enzymes, corrosion inhibitors, antifoams, fragrances, thickeners, solubility promoters, solvents, pH adjusting agents, antiredeposition agents, optical brighteners, graying inhibitors, color transfer inhibitors, antimicrobial active ingredients, antioxidants, UV absorbers and mixtures thereof.

9. A process for producing a polymer film as defined in claim 1, in which
 a) a monomer composition is provided which comprises at least one monomer comprising acrylic acid and/or acrylic acid salts,
 b) the monomer composition provided in step a) is subjected to a free-radical polymerization in the presence of at least one ($C_8$-$C_{18}$-alkyl) polyoxyalkylene ether having 5 to 9 ethylene oxide units per molecule and optionally in the presence of at least one additive, wherein the monomer composition and the at least one ($C_8$-$C_{18}$-alkyl)polyoxyalkylene ether are in a weight ratio from 0.7:1 to 3:1, and
 c) the polymer composition obtained in step b) is converted to a polymer film, wherein the polymer composition has a weight-average molecular weight of from 3000 to 80,000 g/mol.

10. The process according to claim 9, where the free-radical polymerization in step b) takes place in a feed procedure, where at least some of the ($C_8$-$C_{18}$-alkyl) polyoxyalkylene ether having 5 to 9 ethylene oxide units per molecule and optionally, if present, at least some of a solvent are initially introduced, and at least some of the monomer composition provided in step a) and at least one radical starter are introduced into an initial charge.

11. The process according to claim 9, in which, in step c), the polymer composition obtained in step b), optionally after adding at least one additive, is subjected to a film formation selected from casting, blow molding, thermoforming, extrusion and calendering.

12. The polymer film according to claim 1, wherein the polymer film is an at least partial covering of a liquid or solid detergent and cleaner.

13. A covering or coating for a detergent or cleaner portion, comprising polymer film as defined in claim 1.

14. A detergent or cleaner, comprising:
 A) at least a covering and/or coating, comprising a washing- and cleaning-active polymer film as defined in claim 1,
 B) at least one surfactant,
 C) optionally at least one builder,
 D) optionally at least one bleach system,
 E) optionally at least one further additive, which is selected from enzymes, bases, corrosion inhibitors, antifoams and foam inhibitors, dyes, fragrances, fillers, tableting auxiliaries, disintegrants, thickeners, solubility promoters, organic solvents, electrolytes, pH adjusting agents, perfume carriers, fluorescent agents, hydrotropes, antiredeposition agents, optical brighteners, graying inhibitors, shrink preventers, anticrease agents, color transfer inhibitors, antimicrobial active ingredients, antioxidants, corrosion inhibitors, antistats, ironing aids, phobicization and impregnation agents, swelling and slip-resist agents and UV absorbers, and
 F) optionally water.

15. The polymer film according to claim 4, where the monomer comprises no crosslinking monomers which have two or more than two free-radically polymerizable α,β-ethylenically unsaturated double bonds per molecule.

16. The polymer film according to claim 1, wherein the at least one ($C_8$-$C_{18}$-alkyl)polyoxyalkylene ether is selected from the group consisting of: $C_{13}C_{15}$-oxo ethoxylated alcohol, $C_{12}C_{18}$-fatty ethoxylated alcohol and $C_{10}$-Guerbet ethoxylated alcohol.

* * * * *